(12) United States Patent
Yao

(10) Patent No.: US 12,324,987 B2
(45) Date of Patent: Jun. 10, 2025

(54) METHOD AND APPARATUS FOR DISPLAYING VIRTUAL ITEM, DEVICE, AND STORAGE MEDIUM

(71) Applicant: TENCENT TECHNOLOGY (SHENZHEN) COMPANY LIMITED, Shenzhen (CN)

(72) Inventor: Li Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 232 days.

(21) Appl. No.: 17/713,917

(22) Filed: Apr. 5, 2022

(65) Prior Publication Data
US 2022/0226727 A1 Jul. 21, 2022

Related U.S. Application Data

(63) Continuation of application No. PCT/CN2021/086246, filed on Apr. 9, 2021.

(30) Foreign Application Priority Data

May 15, 2020 (CN) .......................... 202010413541.2

(51) Int. Cl.
A63F 13/00 (2014.01)
A63F 13/52 (2014.01)

(52) U.S. Cl.
CPC .................................... A63F 13/52 (2014.09)

(58) Field of Classification Search
CPC ........ A63F 13/52; A63F 13/45; A63F 13/822; A63F 13/56; A63F 13/55; A63F 13/69; A63F 13/58
See application file for complete search history.

(56) References Cited

U.S. PATENT DOCUMENTS 6,210,273 B1 4/2001 Matsuno
2006/0246968 A1 11/2006 Dyke-Wells
(Continued)

FOREIGN PATENT DOCUMENTS

CN 108434734 A 8/2018
CN 109701274 A 5/2019
(Continued)

OTHER PUBLICATIONS

Golden Eye 007 Remote Mines—https://youtu.be/WJGI8emol3c?si=KrdGLDQm_kGboxSa (Year: 2014).*
(Continued)

*Primary Examiner* — Omkar A Deodhar
*Assistant Examiner* — Eric M Thomas
(74) *Attorney, Agent, or Firm* — ANOVA LAW GROUP PLLC

(57) ABSTRACT

A method for displaying a virtual item includes: displaying a first virtual environment picture, the first virtual environment picture displaying a second virtual item in an effective state; controlling, in response to a use instruction, a target virtual character to use an equipped first virtual item; displaying, in response to the second virtual item being located within a first influence range of the first virtual item, that the second virtual item is switched from the effective state to an ineffective state; and displaying, in response to satisfying a restoration condition, that the second virtual item is switched from the ineffective state to the effective state.

20 Claims, 17 Drawing Sheets

(56) References Cited

U.S. PATENT DOCUMENTS

| | | |
|---|---|---|
| 2007/0218966 A1 | 9/2007 | Tilston et al. |
| 2009/0149248 A1* | 6/2009 | Busey .................... A63F 13/12 |
| | | 463/43 |
| 2010/0210333 A1* | 8/2010 | Halash ................... A63F 13/63 |
| | | 463/43 |
| 2018/0250585 A1* | 9/2018 | Weissman ............. G01J 3/0272 |
| 2020/0353357 A1 | 11/2020 | Wan et al. |
| 2020/0398151 A1 | 12/2020 | Zhang et al. |

FOREIGN PATENT DOCUMENTS

| | | |
|---|---|---|
| CN | 110694273 A | 1/2020 |
| CN | 110841289 A | 2/2020 |
| CN | 110917618 A | 3/2020 |
| CN | 111111164 A | 5/2020 |
| CN | 111589149 A | 8/2020 |
| JP | 2001009164 A | 1/2001 |
| JP | 2006254980 A | 9/2006 |
| WO | 2019174443 A1 | 9/2019 |

OTHER PUBLICATIONS

Golden Eye 007 Proximity and Timed Mines—https://goldeneye.fandom.com/wiki/Proximity_Mine (Year: 2020).*

The Japan Patent Office (JPO) Notification of Reasons for Refusal for Application No. 2022-545844 and Translation Jul. 25, 2023 9 Pages.

The World Intellectual Property Organization (WIPO) International Search Report for PCT/CN2021/086246 Jul. 14, 2021 7 Pages (including translation).

China National Intellectual Property Administration (CNIPA) Office Action 1 for 202010413541.2 Jan. 19, 2022 12 Pages (including translation).

* cited by examiner

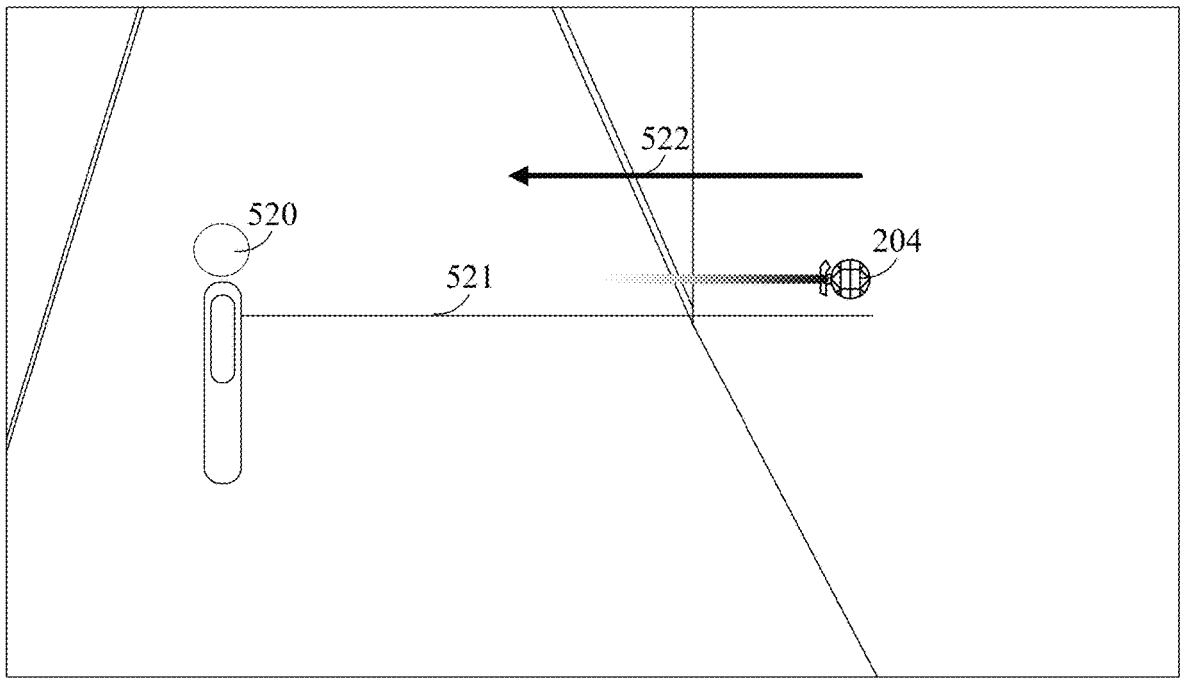

FIG. 13

```
┌─────────────────────────────────────────────────────────────┐
│ Display a first UI, the first UI including a first virtual  │  301
│ environment picture, the first virtual environment picture  │
│ being a picture of a virtual environment observed from a    │
│ perspective of a main control virtual character, the main   │
│ control virtual character having a first virtual item, and  │
│ the first virtual environment picture including a second    │
│ virtual item in an effective state                          │
└─────────────────────────────────────────────────────────────┘
                              │
                              ▼
┌─────────────────────────────────────────────────────────────┐  302
│ Control, in response to a use instruction, the main control │
│ virtual character to use the first virtual item             │
└─────────────────────────────────────────────────────────────┘
                              │
                              ▼
┌─────────────────────────────────────────────────────────────┐
│ Control, in response to the second virtual item being       │  3031
│ located within the first influence range of the first       │
│ virtual item, that the second virtual item is switched      │
│ from a first display form corresponding to the effective    │
│ state to a second display form corresponding to the         │
│ ineffective state                                           │
└─────────────────────────────────────────────────────────────┘
                              │
                              ▼
┌─────────────────────────────────────────────────────────────┐  304
│ Control, in response to satisfying a restoration condition, │
│ that the second virtual item is switched from the           │
│ ineffective state to the effective state                    │
└─────────────────────────────────────────────────────────────┘
```

FIG. 14

METHOD AND APPARATUS FOR DISPLAYING VIRTUAL ITEM, DEVICE, AND STORAGE MEDIUM

CROSS-REFERENCES TO RELATED APPLICATIONS

This application is a continuation application of PCT Patent Application No. PCT/CN2021/086246, entitled "METHOD AND APPARATUS FOR DISPLAYING VIRTUAL PROP, AND DEVICE AND STORAGE MEDIUM" and filed on Apr. 9, 2021, which claims priority to Chinese Patent Application No. 202010413541.2, filed on May 15, 2020 and entitled "METHOD AND APPARATUS FOR USING VIRTUAL ITEM, DEVICE, AND STORAGE MEDIUM", the entire contents of both of which are incorporated herein by reference.

FIELD OF THE TECHNOLOGY

This application relates to the field of applications supporting virtual environments, and in particular, to a method and apparatus for displaying a virtual item, a device, and a storage medium.

BACKGROUND OF THE DISCLOSURE

In an application based on a three-dimensional (3D) virtual environment, for example, a first-person shooting (FPS) game, a virtual character may place mines in the virtual environment. Mines are divided into timed mines and induction mines. Timed mines start a countdown after being placed, and the mines are detonated when the countdown ends. Induction mines use sensors to sense the approach of enemy virtual characters. For example, the sensors may use laser induction, gravity induction, and the like.

In the related art, when an enemy virtual character places a timed mine in the virtual environment, the user may control the virtual character to approach the timed mine to destroy or dismantle the mine. However, for an induction mine, the mine is detonated when the virtual character approaches the induction mine. Therefore, the virtual character cannot approach the induction mine to dismantle or destroy the induction mine, and can only remotely detonate or destroy the induction mine through long-range shooting. However, the long-range shooting has a low hit rate to the induction mine, so that the operation of destroying the induction mine is difficult and the man-machine interaction efficiency is low.

SUMMARY

Embodiments of this application provide a method and apparatus for displaying a virtual item, a device, and a storage medium. The technical solutions are as follows:

According to an aspect of this application, a method for displaying a virtual item is provided, performed by a computer device, the method including: displaying a first virtual environment picture, the first virtual environment picture displaying a second virtual item in an effective state; controlling, in response to a use instruction, a target virtual character to use an equipped first virtual item; displaying, in response to the second virtual item being located within a first influence range of the first virtual item, that the second virtual item is switched from the effective state to an ineffective state; and displaying, in response to satisfying a restoration condition, that the second virtual item is switched from the ineffective state to the effective state.

According to another aspect of this application, an apparatus for displaying a virtual item is provided, including: a processor and a memory, the memory storing at least one computer program, the at least one computer program being loaded and executed by the processor to implement: displaying a first virtual environment picture, the first virtual environment picture displaying a second virtual item in an effective state; controlling, in response to a use instruction, a target virtual character to use an equipped first virtual item; displaying, in response to the second virtual item being located within a first influence range of the first virtual item, that the second virtual item is switched from the effective state to an ineffective state; and displaying, in response to satisfying a restoration condition, that the second virtual item is switched from the ineffective state to the effective state.

According to another aspect of this application, a non-transitory computer-readable storage medium is provided, storing at least one computer program, the at least one computer program being loaded and executed by a processor to implement the method for displaying a virtual item described in the foregoing aspect.

According to another aspect of this application, a computer program product or a computer program is provided, including one or more program code, the one or more program code being stored in a computer-readable storage medium. A processor of a computer device can read the one or more program code from the computer-readable storage medium, and execute the one or more program code to enable the computer device to implement the method for displaying a virtual item described in the foregoing aspect.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 13 is a schematic diagram of a virtual environment of a method for displaying a virtual item according to another exemplary embodiment of this application.

FIG. 14 is a flowchart of a method for displaying a virtual item according to another exemplary embodiment of this application.

DESCRIPTION OF EMBODIMENTS

Figure 1:
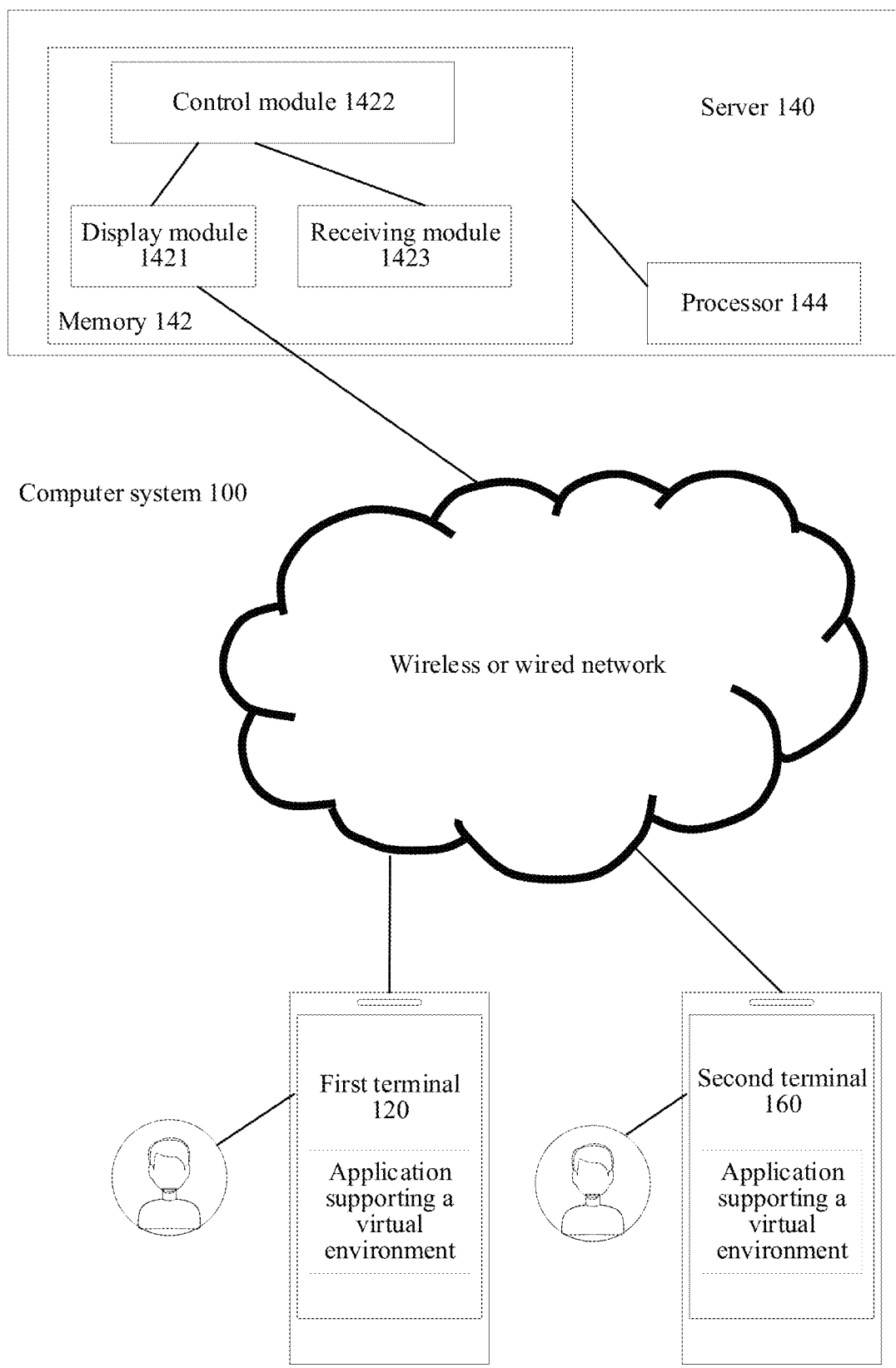
FIG. 1 is a block diagram of an implementation environment according to an exemplary embodiment of this application.

To make objectives, technical solutions, and advantages of this application clearer, the following further describes implementations of this application in detail with reference to the accompanying drawings.

First, terms involved in the embodiments of this application are introduced:

Virtual environment: It is a virtual environment displayed (or provided) by an application when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, or a 3D virtual environment. This is not limited in the embodiments of this application. A description is made in the following embodiments by using an example that the virtual environment is a 3D virtual environment.

Virtual character: It is a movable object in a virtual environment. The movable object may be a virtual person, a virtual animal, a cartoon character, or the like, such as a character, an animal, a plant, an oil drum, a wall, or a stone displayed in a 3D virtual environment. In some embodiments, the virtual character is a 3D model created based on a skeletal animation technology. Each virtual character has a respective shape and size in the 3D virtual environment, and occupies some space in the 3D virtual environment.

Virtual item: Virtual items include at least one of a virtual weapon, a functional item, or a virtual device. For example, in this application, virtual items refer to virtual weapons, and the virtual weapons are weapons that can be used by virtual characters in a virtual environment. For example, a virtual weapon is an item that affects an activity state or a hit point value of another virtual character after being used by a virtual character. The virtual weapons include cold weapons, firearms, artillery, armored combat vehicles, anti-riot weapons, biological and chemical weapons, nuclear weapons, new concept weapons, and the like. For example, the virtual items may be knives, guns, swords, pistols, rifles, submachine guns, machine guns, special guns, shotguns, grenades, rocket launchers, mortars, tank guns, cannons, missiles, laser weapons, microwave weapons, particle beams weapons, kinetic energy interceptors, electromagnetic guns, pulse weapons, signal jamming weapons, and the like. For example, a first virtual item in this application refers to a shooting or throwing virtual weapon, such as a grenade, an electromagnetic pulse, a flash grenade, a smoke grenade, or a missile. For example, a second virtual item in this application refers to a placement-type virtual weapon, such as a mine, a trip mine, or a trap.

First-person shooting (FPS) game: It is a shooting game in which a user can play from a first-person perspective. A virtual environment picture in the game is a picture obtained by observing a virtual environment from a perspective of a main control virtual character. In the game, at least two virtual characters play in a single-round battle mode in the virtual environment. The virtual character evades attacks from other virtual characters and/or dangers (such as a poison gas area, a swamp, and a bomb) in the virtual environment to survive in the virtual environment. When the hit points of the virtual character in the virtual environment is zero, the life of the virtual character in the virtual environment ends, and the final virtual character surviving in the virtual environment wins. In some embodiments, a battle starts with a moment when a first client joins the battle, and ends with a moment when the last client exits the battle. Each client may control one or more virtual characters in the virtual environment. In some embodiments, arena modes of the battle may include a single-player battle mode, a two-player team battle mode, or a multi-player team battle mode. The battle mode is not limited in the embodiments of this application.

UI control: It is any visual control or element that can be seen in a UI of an application, for example, a control such as a picture, an input box, a text box, a button, or a label. Some UI controls respond to an operation of the user. For example, the user triggers a use control to control the main control virtual character to use the first virtual item.

In the embodiments of this application, when a virtual weapon is "equipped, carried, or assembled", it means that a virtual character owns the virtual weapon, or a virtual character owns an inventory with an inventory slot and the virtual weapon is stored in the inventory of the virtual character, or a virtual character is using the virtual weapon.

The method for displaying a virtual item provided in this application may be applied to a virtual reality (VR) application, a 3D map program, a military simulation program, an FPS game, a multiplayer online battle arena (MOBA) game, and the like. An application during a game is used as an example for description in the following embodiments.

A game based on a virtual environment usually includes maps of one or more game worlds. The virtual environment in the game simulates scenes in the real world. A user may control a virtual character in the game to perform actions in the virtual environment such as walking, running, jumping, shooting, fighting, driving, using a virtual weapon to attack another virtual character, and using a virtual weapon to charge up attacks on another virtual character, which has relatively high interactivity. In addition, a plurality of users may form a team online to perform an arena game.

FIG. 1 is a structural block diagram of a computer system according to an exemplary embodiment of this application. The computer system 100 includes a first terminal 120, a server 140, and a second terminal 160.

An application supporting a virtual environment is installed and run on the first terminal 120. The application may be any one of a VR application, a 3D map application, a military simulation program, an FPS game, a MOBA game, or a multiplayer gunfight survival game. The first terminal 120 is a terminal used by a first user. The first user uses the first terminal 120 to control a main control virtual character in a virtual environment to perform motions. The motions include, but are not limited to, at least one of body posture adjustment, crawling, walking, running, cycling, jumping, driving, shooting, throwing, using a virtual weapon to attack another virtual character, or using a virtual weapon to charge up attacks on another virtual character. For example, the main control virtual character is a first virtual person, such as a simulated character object or a cartoon character object.

The first terminal 120 is connected to the server 140 by using a wireless network or a wired network.

The server 140 includes at least one of one server, a plurality of servers, a cloud computing platform, or a virtualization center. For example, the server 140 includes a processor 144 and a memory 142. The memory 142 includes a display module 1421, a control module 1422, and a receiving module 1423. The server 140 is configured to provide a backend service for an application supporting a 3D virtual environment. In some embodiments, the server 140 is responsible for primary computing work, and the first terminal 120 and the second terminal 160 are responsible for secondary computing work; or the server 140 is responsible for secondary computing work, and the first terminal 120 and the second terminal 160 are responsible for primary computing work; or the server 140, the first terminal 120 and the second terminal 160 perform collaborative computing by using a distributed computing architecture among each other.

An application supporting a virtual environment is installed and run on the second terminal 160. The application may be any one of a VR application, a 3D map application, a military simulation program, an FPS game, a MOBA game, and a multiplayer gunfight survival game. The second terminal 160 is a terminal used by a second user. The second user uses the second terminal 160 to control a second virtual character in a virtual environment to perform motions. The motions include, but are not limited to, at least one of body posture adjustment, crawling, walking, running, cycling, jumping, driving, shooting, throwing, using a virtual weapon to attack another virtual character, or using a virtual weapon to charge up attacks on another virtual character. For example, the second virtual character is a second virtual person, such as a simulated character object or a cartoon character object.

In some embodiments, the first virtual person and the second virtual person are located in the same virtual environment.

In some embodiments, the applications installed on the first terminal 120 and the second terminal 160 are the same, or the applications installed on the two terminals are the same type of applications in different control system platforms. The first terminal 120 may be generally one of a plurality of terminals, and the second terminal 160 may be generally one of a plurality of terminals. In this embodiment, only the first terminal 120 and the second terminal 160 are used as examples for description. The first terminal 120 and the second terminal 160 are of the same device type or of different device types. The device type includes at least one of an augmented reality (AR) device, a VR device, a smart wearable device, a smartphone, a smartwatch, a smart speaker, a tablet computer, an e-book reader, a Moving Picture Experts Group Audio Layer III (MP3) player, a Moving Picture Experts Group Audio Layer IV (MP4) player, a laptop, or a desktop computer. The following embodiment is described by using an example that the terminal includes a smartphone.

A person skilled in the art may learn that there may be more or fewer terminals. For example, there may be only one terminal, or there may be dozens of or hundreds of terminals or more. The quantity and the device type of the terminal are not limited in the embodiments of this application.

Figure 2:
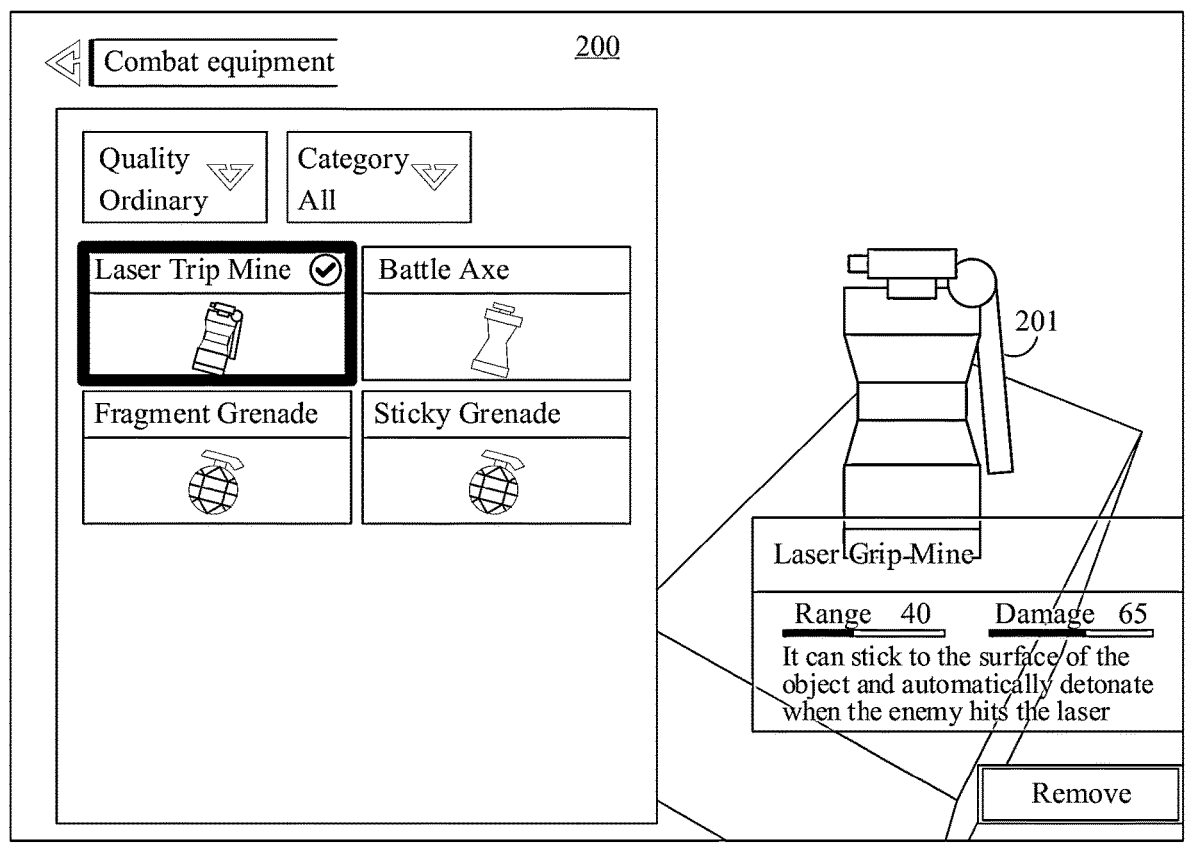
FIG. 2 is a schematic diagram of a user interface of a method for displaying a virtual item according to an exemplary embodiment of this application.
Figure 3:
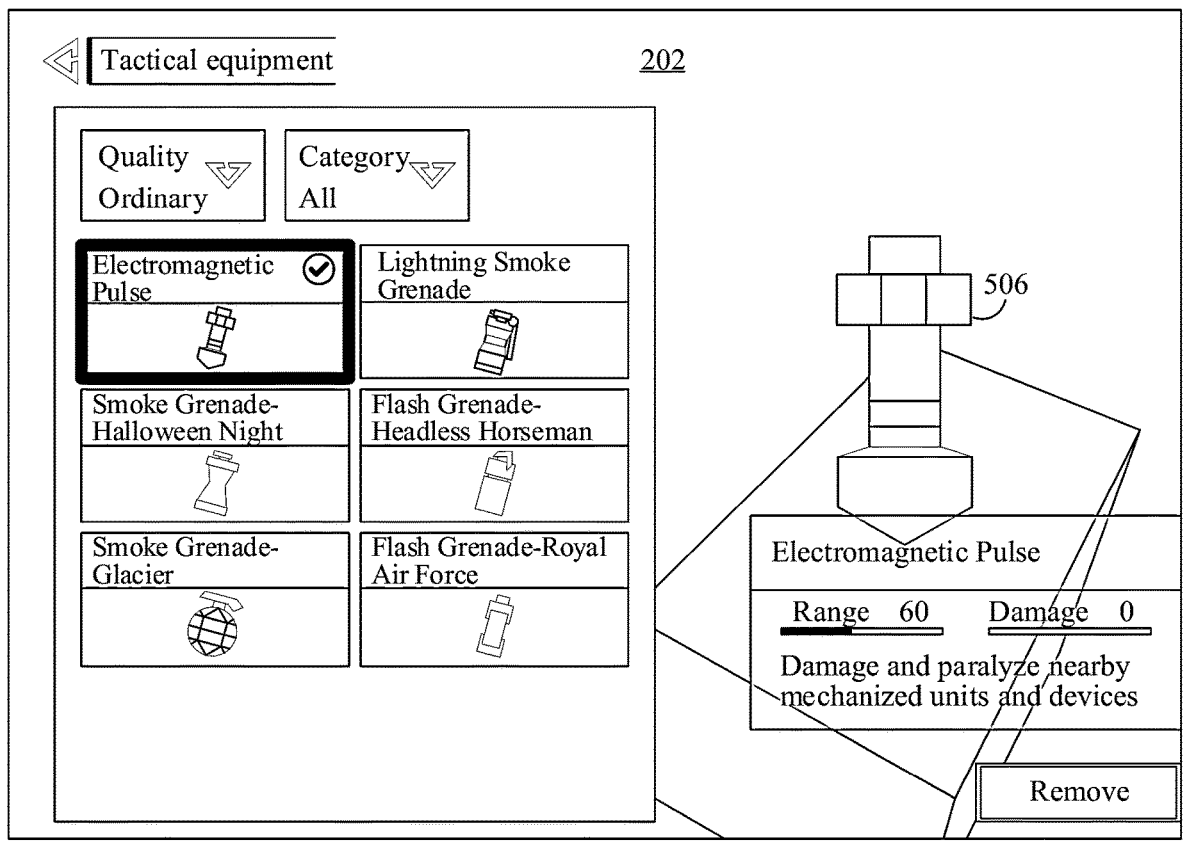
FIG. 3 is a schematic diagram of a user interface of a method for displaying a virtual item according to another exemplary embodiment of this application.

This application provides a type of tactical equipment: an electromagnetic pulse (a first virtual item). The electromagnetic pulse may be used to quickly destroy combat equipment (a second virtual item). The tactical equipment is a throwing weapon that is mainly disruptive. The tactical equipment does not cause much damage to an enemy, but causes mechanical units to fail or affects other players to control other virtual characters. The combat equipment is a placed weapon that causes much damage to an enemy, such as a mine, a trip mine, or a trap. The placed weapon may adhere to any surface in a virtual environment. For example, a user may choose to carry one tactical equipment and one combat equipment before entering a game. For example, as shown in FIG. 2, the user may select combat equipment for the current game on a combat equipment selection interface 200, for example, the user selects a laser trip mine 201 as the combat equipment for the current game. When the user uses the laser trip mine 201 in the game, the laser trip mine 201 may be adhered to a surface of an object. When an enemy enters an influence range of the laser trip mine 201, the laser trip mine 201 is automatically detonated to cause damage to the enemy. As shown in FIG. 3, the user may select tactical equipment for the current game on a tactical equipment selection interface 202, for example, the user selects an electromagnetic pulse 506 as the tactical equipment for the current game. When the user uses the electromagnetic pulse 506 in the game, the electromagnetic pulse 506 may be thrown out to destroy mechanical units (combat equipment, mechanical weapons, virtual vehicles, and the like) near a drop location.

Figure 4:
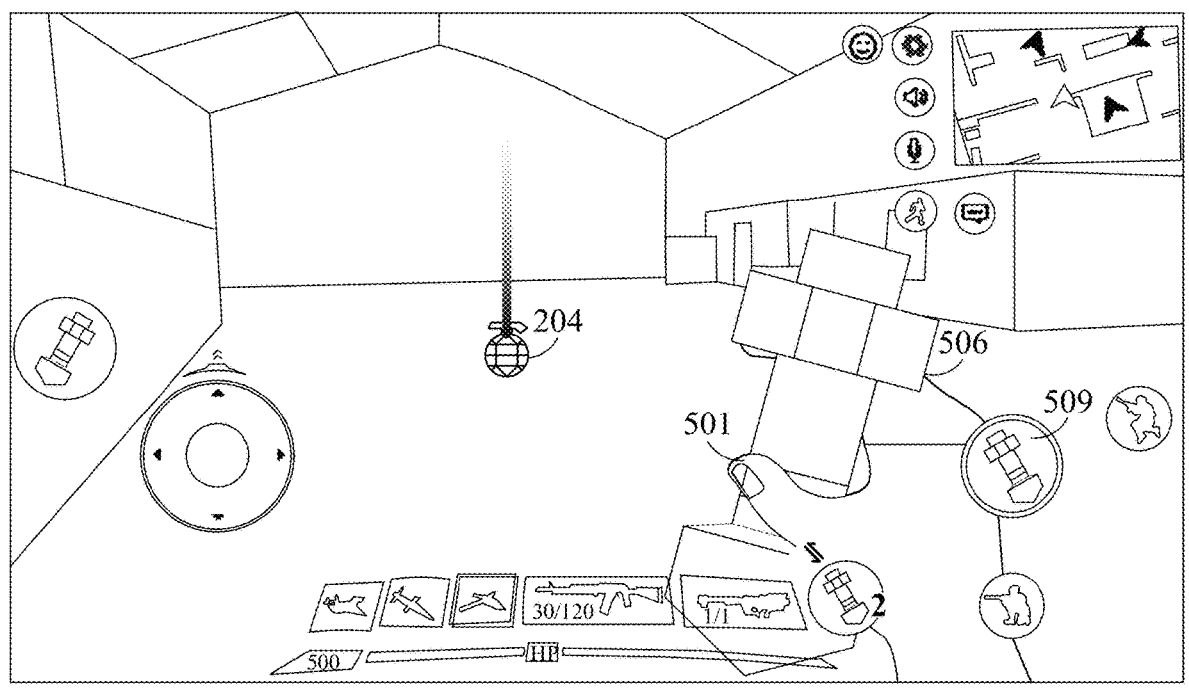
FIG. 4 is a schematic diagram of a user interface of a method for displaying a virtual item according to another exemplary embodiment of this application.
Figure 5:
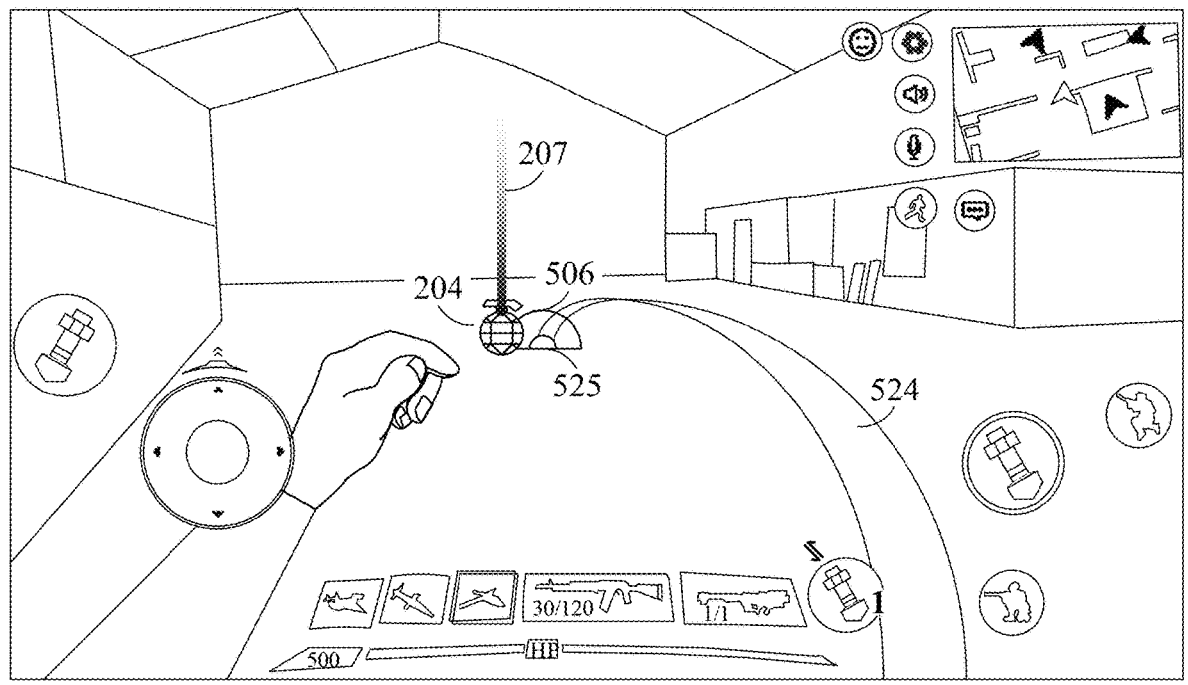
FIG. 5 is a schematic diagram of a user interface of a method for displaying a virtual item according to another exemplary embodiment of this application.
Figure 6:
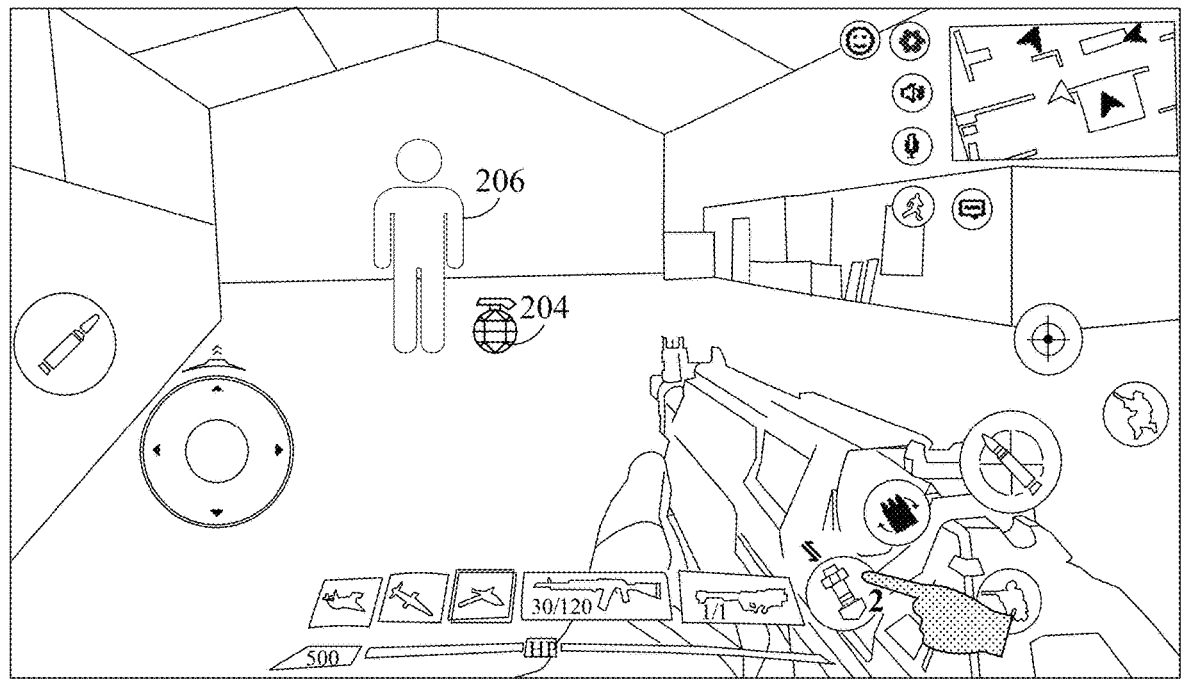
FIG. 6 is a schematic diagram of a user interface of a method for displaying a virtual item according to another exemplary embodiment of this application.

For example, an example is taken in which the combat equipment is a mine and the tactical equipment is an electromagnetic pulse. When there is a mine placed by an enemy virtual character in the virtual environment, a main control virtual character may throw the electromagnetic pulse at the mine. After the electromagnetic pulse hits the ground for a period of time, an explosion occurs. If the mine is within an explosion range of the electromagnetic pulse, the mine is temporarily disabled. The failure of the mine is only temporary. After a failure time of the mine reaches a specific duration, the mine automatically returns to normal. For example, as shown in FIG. 4, there is a mine 204 placed by an enemy virtual character in the virtual environment. When a virtual character approaches the mine 204, the mine 204 is automatically detonated to cause damage to the approaching virtual character. The user may use the electromagnetic pulse 506 to destroy the mine 204 from a distance. After being equipped with the electromagnetic pulse 506, the user clicks a firing control 509 to control the main control virtual character to throw the electromagnetic pulse 506. As shown in FIG. 5, the main control virtual character throws the electromagnetic pulse 506 along a parabola, so that the electromagnetic pulse 506 falls near the mine 204. The electromagnetic pulse 506 automatically explodes after hitting the ground for a period of time, and the explosion destroys the mine 204. For example, as shown in FIG. 6, the mine 204 is destroyed. In this case, a virtual character 206 approaches the mine 204, and the mine 204 is not automatically detonated. For example, the damage to the mine 204 by the electromagnetic pulse 506 is only temporary, and the mine 204 automatically returns to normal after a period of time.

For example, to facilitate the user to distinguish whether the mine is in an ineffective state or an effective state, different special effects are displayed on the mine. For example, the mine in the effective state displays a beam, while the mine in the ineffective state does not display the beam. For example, as shown in FIG. 5, a special beam 207 is displayed above the mine 204 in the effective state, while as shown in FIG. 6, no special beam is displayed above the mine 204 in the ineffective state. For example, beams of mines are displayed in different colors according to different camps of virtual characters that place the mines. For example, a mine placed by a virtual character of an enemy camp is displayed as a red beam, and a mine placed by a virtual character of our camp is displayed as a blue beam.

Figure 7:
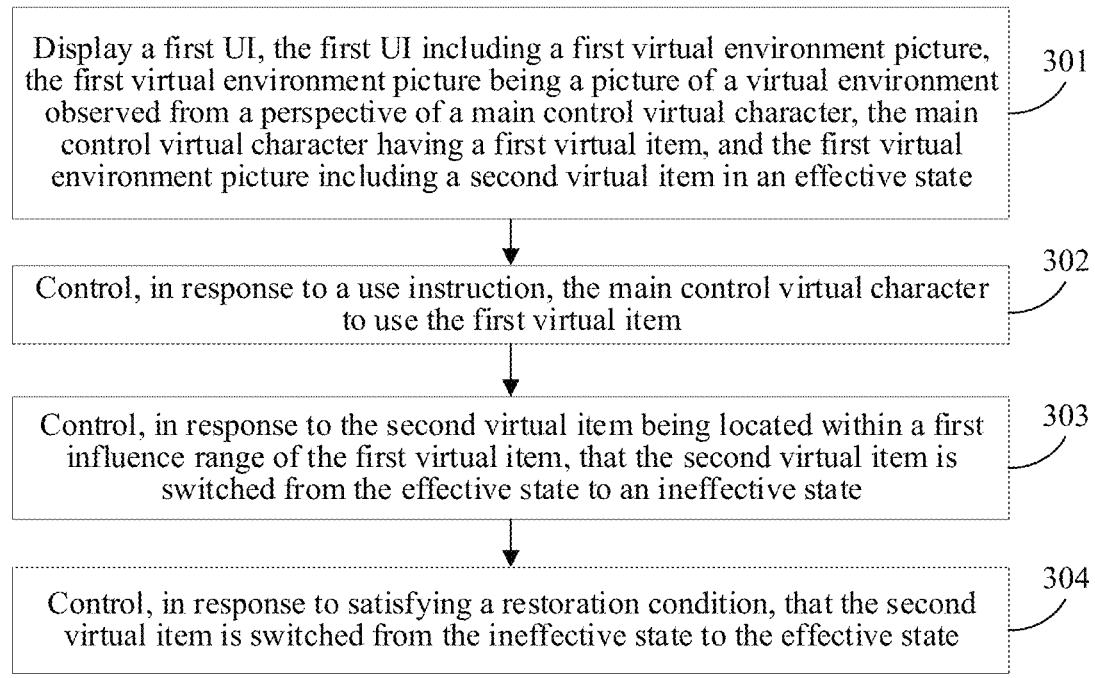
FIG. 7 is a flowchart of a method for displaying a virtual item according to an exemplary embodiment of this application.

FIG. 7 is a flowchart of a method for displaying a virtual item according to an exemplary embodiment of this application. The method is applicable to the first terminal 120 or the second terminal 160 in the computer system shown in FIG. 1 or another terminal in the computer system. A client of an application supporting a virtual environment is installed on the terminal. The terminal is an exemplary description of the computer device. The method includes the following steps:

Step 301: The terminal displays a first UI, the first UI including a first virtual environment picture, the first virtual environment picture being a picture of a virtual environment observed from a perspective of a main control virtual character, the main control virtual character having a first virtual item, and the first virtual environment picture including a second virtual item in an effective state.

One example of the foregoing step 301 that the terminal displays the first virtual environment picture is that the terminal displays the first UI including the first virtual environment picture. In some embodiments, the terminal may alternatively directly display the first virtual environment picture, and the display manner of the first virtual environment picture is not specifically limited in this embodiment of this application. The first virtual environment picture displays the second virtual item in the effective state.

In some embodiments, the first virtual environment picture is a picture of the virtual environment observed from the perspective of the main control virtual character. The main control virtual character is an exemplary description of a target virtual character. A perspective refers to an observation angle at which observation is performed in a virtual environment from a first-person perspective or a third-person perspective of a virtual character. In some embodiments, in the embodiments of this application, the perspective is an angle for observing the virtual character by using a camera model in the virtual environment.

In some embodiments, the camera model performs automatic following on the virtual character in the virtual environment, that is, when the position of the virtual character changes in the virtual environment, the camera model changes at the same time with the position of the virtual character in the virtual environment, and the camera model is always located in a preset distance range of the virtual character in the virtual environment. In some embodiments, in the automatic following process, a relative position between the camera model and the virtual character remains unchanged.

The camera model is a 3D model located around the virtual character in the 3D virtual environment. When a first-person perspective is used, the camera model is located around the head of the virtual character or located at the head of the virtual character. When a third-person perspective is used, the camera model may be located behind the virtual character and bound to the virtual character, or may be located at any position away from the virtual character by a preset distance. The virtual character located in the virtual environment may be observed from different angles through the camera model. In some embodiments, when the third-person perspective is a first-person over-shoulder perspective, the camera model is located behind the virtual character (for example, the head and the shoulders of a virtual person). In some embodiments, in addition to the first-person perspective and the third-person perspective, there are other perspectives, for example, a top perspective. When the top perspective is used, the camera model may be located above the head of the virtual character. The top perspective is a perspective of the virtual environment observed at an angle from the air. In some embodiments, the camera model is not actually displayed in the virtual environment. In other words, the camera model is not displayed in the virtual environment displayed in the UI.

A description is made by using an example in which the camera model is located at any position at a preset distance from the virtual character. In some embodiments, one virtual character corresponds to one camera model, and the camera model may rotate with the virtual character as a rotation center. For example, the camera model is rotated with any point of the virtual character as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual character may be the head or the torso of the virtual character, or any point around the virtual character. This is not limited in the embodiments of this application. In some embodiments, when the camera model observes the virtual character, a center orientation of the perspective of the camera model points to a direction of a point of the sphere surface where the camera model is located pointing to the sphere center.

In some embodiments, the camera model may further observe the virtual character from different directions of the virtual character at a preset angle.

Figure 8:
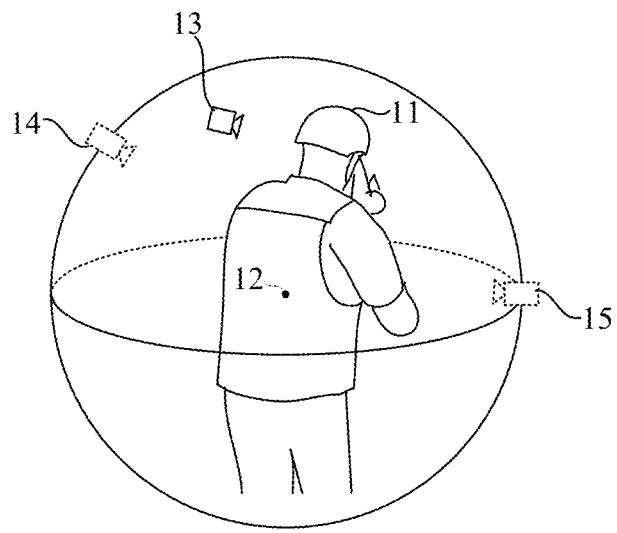
FIG. 8 is a schematic diagram of a camera model corresponding to a perspective of a virtual character according to an exemplary embodiment of this application.

For example, referring to FIG. 8, a point in a virtual character 11 is determined as a rotation center 12, and the camera model rotates around the rotation center 12. In some embodiments, the camera model is configured with an initial position, and the initial position is an upper rear position of the virtual character (for example, a rear position of the brain). For example, as shown in FIG. 8, the initial position is a position 13. When the camera model rotates to a position 14 or a position 15, the perspective direction of the camera model changes as the rotation of the camera model.

In some embodiments, the virtual environment displayed on the virtual environment picture includes at least one of the following elements: a mountain, a plain, a river, a lake, a sea, a desert, a swamp, quicksand, sky, a plant, a building, a vehicle, or a person.

The main control virtual character is a virtual character controlled by a client installed on the terminal, and the main control virtual character is an exemplary description of the target virtual character. In some embodiments, the main control virtual character is controlled by a user that uses the terminal.

In some embodiments, since the user using the terminal may have the permission to control a plurality of virtual characters in the game, a virtual character that is currently controlled by the user is referred to as a main control virtual character, and a virtual character that the user can control but is not currently controlled (or is hosted by the user to the system and enters an automatic battle mode) is referred to as a non-main control virtual character. In this case, the main control virtual character is not necessarily the target virtual character. The target virtual character refers to a virtual character equipped with the first virtual item. If the user controls a virtual character to equip the first virtual item and then switches the operation permission to another virtual character, the virtual character originally equipped with the first virtual item is changed from the main control virtual character to a non-main control virtual character, but this non-main control virtual character is still the target virtual character.

In some other embodiments, since some clients provide functions such as friend fight watching and anchor fight watching, in the watching mode, the user may switch a perspective of a currently watched virtual character at any time. In the watching mode, if the watched virtual character is equipped with the first virtual item, the watched virtual character is a target virtual character, but the watched virtual character is not a "main control virtual character" controlled by the audience.

The following embodiments are described by taking an example in which the target virtual character is the main control virtual character and the main control virtual character is equipped with the first virtual item. In some embodiments, the main control virtual character is a virtual character that owns the first virtual item. The first virtual item may be a firearm, such as a sniper rifle, a rifle, a pistol, a bow, or an arrow. The first virtual item may be alternatively an equipment item, such as armor, a balloon, a backpack, or a watch. The first virtual item may be alternatively a throwing item (throwing weapon), such as a grenade, a flash grenade, a flare, a pulse bomb, or a pan. For example, the first virtual item is a throwing item (throwing weapon).

For example, that the main control virtual character owns the first virtual item means that the main control virtual character has obtained the first virtual item, and can use the first virtual item after at least one operation, that is, the main control virtual character is equipped with the first virtual item. For example, the main control virtual character holds the first virtual item in the hand, or the main control virtual character is equipped with the first virtual item on the body, or the first virtual item is in the backpack of the main control virtual character, or the first virtual item is in an equipment bar of the main control virtual character, or the first virtual item is in an equipment option bar of the first virtual item.

Figure 9:
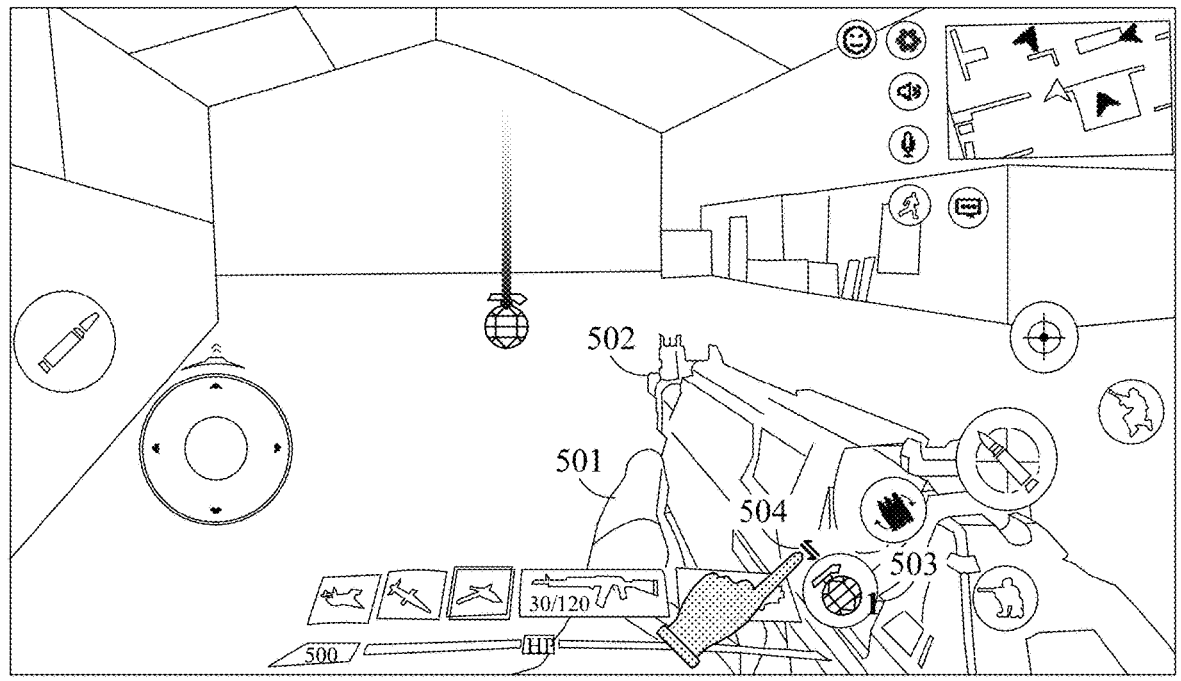
FIG. 9 is a schematic diagram of a user interface of a method for displaying a virtual item according to another exemplary embodiment of this application.
Figure 10:
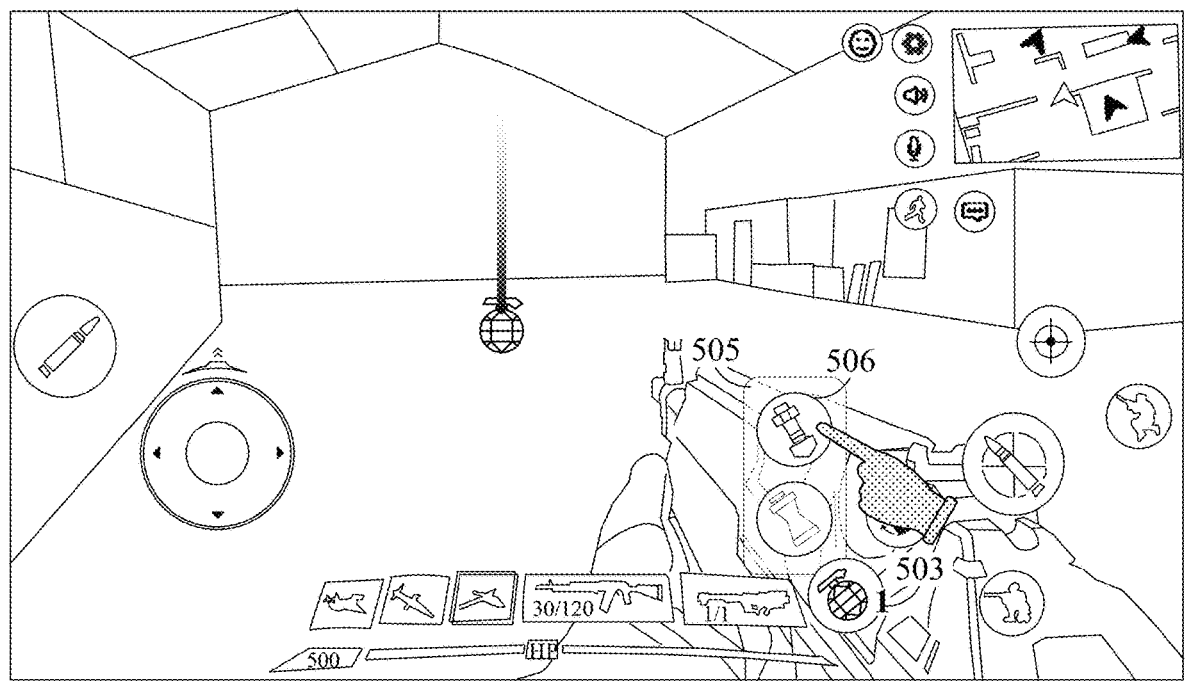
FIG. 10 is a schematic diagram of a user interface of a method for displaying a virtual item according to another exemplary embodiment of this application.
Figure 11:
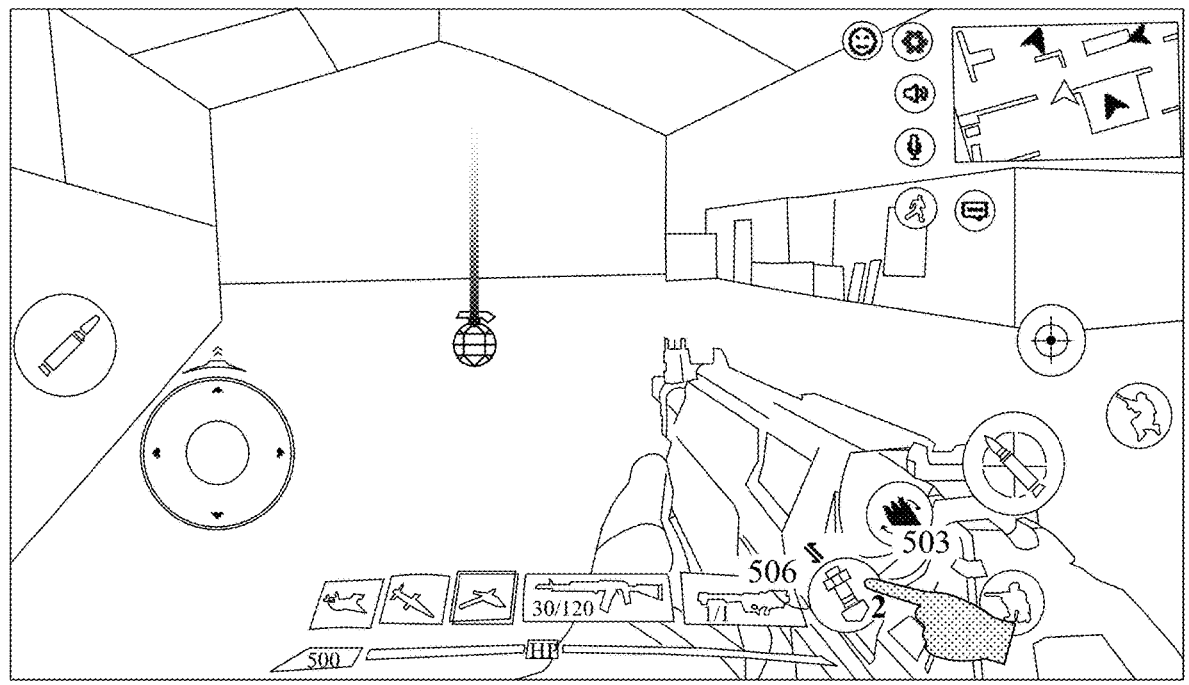
FIG. 11 is a schematic diagram of a user interface of a method for displaying a virtual item according to another exemplary embodiment of this application.

For example, the first virtual item is a handheld throwing item (an electromagnetic pulse). FIG. 9 shows a first UI. The first UI includes a first virtual environment picture obtained by observing the virtual environment from the first-person perspective of the main control virtual character. Only part of the model of the main control virtual character, that is, a hand 501, is displayed in the first virtual environment picture. The main control virtual character has the first virtual item, that is, the electromagnetic pulse, but the main control virtual character in the current state is holding a machine gun 502. An equipment bar 503 is equipped with a mine. In this case, a first user may display the first virtual item (the electromagnetic pulse) in the equipment bar 503 through an equipment switching operation. For example, the switching operation may be triggering an equipment switching control 504 on the first UI, to control an equipment alternative bar 505 shown in FIG. 10 to pop up in the first UI, and selecting a first virtual item (an electromagnetic pulse) 506 in the equipment alternative bar 505, to control the main control virtual character to display the first virtual item (the electromagnetic pulse) 506 in the equipment bar 503. As shown in FIG. 11, after the user selects the first virtual item (the electromagnetic pulse) 506, the first virtual item (the electromagnetic pulse) 506 is displayed in the equipment bar 503. For example, the first user may further control the main control virtual character to equip the current throwing item by triggering an equipment control on the equipment bar 503. For example, as shown in FIG. 11, the current throwing item in the equipment bar 503 is the first virtual item (the electromagnetic pulse) 506, and the first user triggers the equipment control to control the main control virtual character to be equipped with the first virtual item. As shown in FIG. 4, after the main control virtual character is equipped with the first virtual item, the hand 501 holds the first virtual item (the electromagnetic pulse) 506. For example, this embodiment shows a method of performing a switching operation through a UI control on a UI. For example, the switching operation may be alternatively implemented in another operation manner, for example, through an operation handle of a game device, through gesture or action recognition of an AR device or a VR device, or through an operation on an input device such as a keyboard or a mouse. For example, the UIs shown in FIG. 4, FIG. 9, FIG. 10, and FIG. 11 may all be the first UI.

For example, the first virtual item may be picked up by the main control virtual character from the virtual environment after entering the game; or may be pre-equipped before entering the game. For example, in a shooting game, a virtual character may carry some equipment into the game before entering the game. As shown in FIG. 3, in a tactical equipment interface, the user may select the first virtual item (the electromagnetic pulse) 506 to equip the first virtual item (the electromagnetic pulse) 506. After entering the game, the first virtual item (the electromagnetic pulse) is directly placed in the backpack or equipment bar of the main control virtual character, which does not need to be picked up from the virtual environment or obtained during the game.

A second virtual item is further displayed in the first virtual environment picture of the first UI. For example, the second virtual item is placed in the virtual environment by another virtual characters. For example, the second virtual item is placed in the virtual environment by an enemy virtual character of an enemy camp of the main control virtual character. For example, the second virtual item may be alternatively placed in the virtual environment by the main control virtual character. For example, the second virtual item is a placed weapon, such as a mine, a trap, or a trip mine. A placed weapon is placed by a virtual character at a position in the virtual environment. After placement, the placed weapon does not take effect immediately, but takes effect when a trigger condition is met. For example, the placed weapon automatically explodes three minutes after being placed; or the placed weapon automatically explodes when another virtual character approaches the placed weapon; or after the first virtual character places the placed weapon in the virtual environment, the first virtual character remotely controls the placed weapon to explode. For example, the second virtual item has adhesion, and the second virtual item may be adhered to any surface in the virtual environment, for example, the second virtual item may be adhered to at least one surface of the ground, a wall, a ceiling, a tree, and a virtual vehicle.

For example, the second virtual item has two states, an effective state and an ineffective state. The second virtual item in the effective state produces an effect on a target unit that enters an influence range. The target unit is an exemplary description of the target object. The target object may be a mechanical unit such as a virtual item, or a non-mechanical unit such as another virtual character. The type of the target object is not specifically limited in this embodiment of this application. The second virtual item in the ineffective state produces no effect on the target unit that enters the influence range. For example, the second virtual item is a virtual item that automatically detects whether there is a target unit within the influence range, and when a target unit enters the influence range, the second virtual item automatically takes effect to produce an effect on the target unit.

Figure 12:
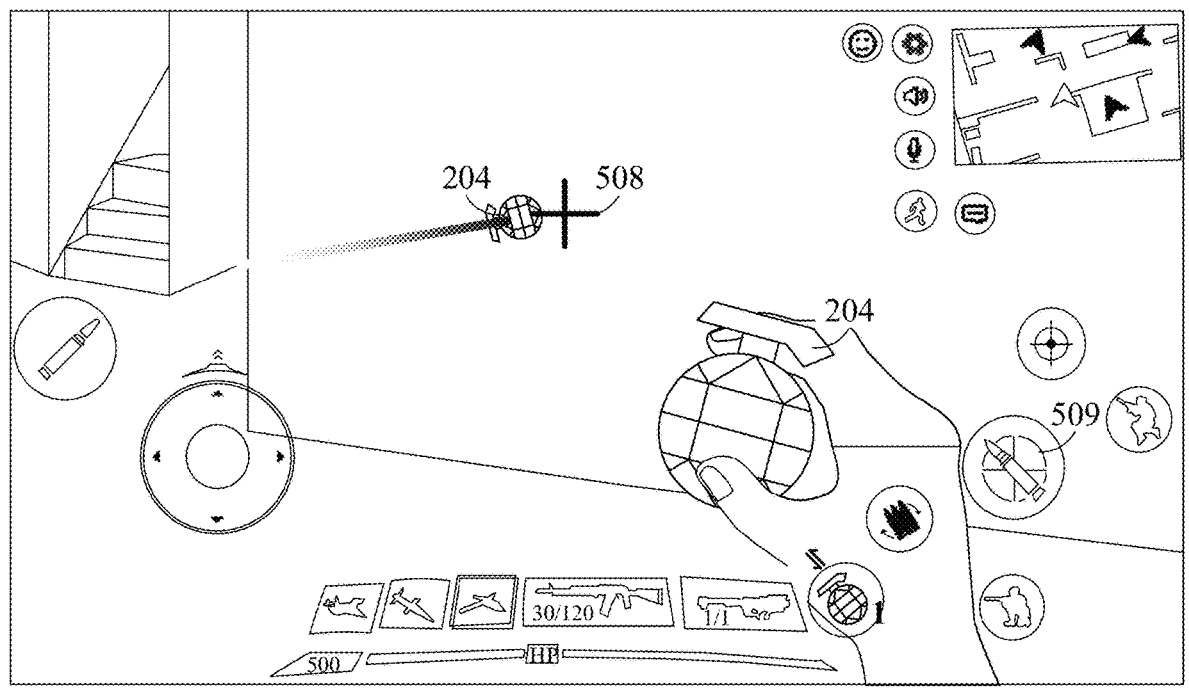
FIG. 12 is a schematic diagram of a user interface of a method for displaying a virtual item according to another exemplary embodiment of this application.

For example, an exemplary embodiment is provided in which a virtual character places a second virtual item in a virtual environment. As shown in FIG. 12, the virtual character holds the mine (the second virtual item) 204. The user uses a sight bead 508 to aim at a position where the mine 204 is to be placed, and then clicks the firing control 509 to control the virtual character to place the mine 204 at the aiming position. For example, the client uses ray detection to determine the position and direction of placing the second virtual item in the virtual environment. As shown in FIG. 13, when the user triggers the firing control, the client shoots a ray 521 from any point on the body of a virtual character 520 according to a current position of the virtual character 520 and an aiming direction of the user. The ray 521 intersects a surface in the virtual environment at a point, and the point is the aiming point of the user. The client obtains a normal vector 522 of the surface where the aiming point is located, determines an orientation of the mine 204 according to the normal vector 522, and places the mine 204 on the aiming point.

Step 302: The terminal controls, in response to a use instruction, the main control virtual character to use the first virtual item.

The foregoing step 302 is one example of the terminal controlling, in response to a use instruction, a target virtual character to use an equipped first virtual item.

The use instruction is generated by the client; or, the use instruction is transmitted by the server to the client. For example, the use instruction is generated after the client obtains a use operation of the user. For example, the use instruction includes use manners of the first virtual item, such as a use time, a use location, a use quantity, a use target, a use direction, a use force, and a use distance of the first virtual item. The client controls the main control virtual character to use the first virtual item according to the use instruction.

For example, the use instruction is generated after the client obtains a use operation of the user. The use operation may be the user triggering the UI control on the UI, may be a gesture or action operation of the user, may be a voice instruction of the user, or may be a control operation of the user using an input device such as a keyboard, a game handle, or a mouse. For example, the user may trigger various operations of the UI control or the input device, for example, clicking, double clicking, long pressing, sliding, pressing, and tapping. For example, the client may generate the use instruction by recognizing the gesture or action operation. For example, the client generates the use instruction by recognizing a throwing action made by the user. For example, the client may alternatively generate the use instruction by recognizing the voice instruction issued by the user. For example, the client may generate the use instruction after recognizing "throw in the direction of 1 o'clock" spoken by the user.

For example, as shown in FIG. 4, there is a firing control 509 on the UI. After the user triggers the firing control 509, the client generates the use instruction to control the main control virtual character to use the first virtual item (the electromagnetic pulse) 506.

Step 303: The terminal controls, in response to the second virtual item being located within a first influence range of the first virtual item, that the second virtual item is switched from the effective state to an ineffective state.

The foregoing step 303 is one example of the terminal displaying, in response to the second virtual item being located within a first influence range of the first virtual item, that the second virtual item is switched from the effective state to an ineffective state. In other words, after controlling the second virtual item to switch from the effective state to the ineffective state, the terminal displays that the second virtual item is switched from the effective state to the ineffective state, and synchronizes first state switching information to the server. The server then synchronizes the information to other terminals, where the first state switching information indicates that the second virtual item is switched from the effective state to the ineffective state.

In another embodiment, the server and each terminal in the game synchronize battle information based on a frame synchronization technology, and the battle information includes but is not limited to: the position of the virtual character, the position of the first virtual item, the position of the second virtual item, user operation information of the user, and the like. When detecting that the second virtual item is located within the first influence range of the first virtual item, the server controls the second virtual item to switch from the effective state to the ineffective state, and sends the first state switching information of the second virtual item to each terminal participating in the game. After receiving the first state switching information, each terminal displays that the second virtual item is switched from the effective state to the ineffective state, where the first state switching information indicates that the second virtual item is switched from the effective state to the ineffective state.

The first influence range is an effective range of the first virtual item, that is, the first virtual item is to destroy a virtual item located within the first influence range. For example, the first influence range is a range determined according to the position of the first virtual item, or the first influence range is a range determined according to the position of the main control virtual character. For example, when the first virtual item is a throwing item, the first influence range may be determined according to a landing point of the first virtual item. When the first virtual item is a virtual item used in place by the main control virtual character, the first influence range may be determined according to the position where the main control virtual character is located. For example, the first influence range may be a bounded space range, or may be a directional range for a specific target or specific targets. The method of determining the first influence range may be arbitrary. For example, the first influence range may be a range of a sphere with a radius R and with the main control virtual character being a center, R being any value greater than 0; or may be a region range (a two-dimensional region) selected when the main control virtual character uses the first virtual item. The space above or/and below the region belongs to the first influence range, or a specific height of space above or/and below the region belongs to the first influence range. Alternatively, one or some targets selected by the main control virtual character when the first virtual item is used may be the first influence range; or a virtual item or virtual character hit by the first virtual item is used as the first influence range; or after the first virtual item hits a specific point, a 3D space determined by using the point as a reference point is used as the first influence range.

For example, the first virtual item destroys the second virtual item, and the second virtual item is switched from the effective state to the ineffective state. The effective state is a state in which the second virtual item has an original function. The ineffective state is a state in which the second virtual item does not have the original function. For example, the original function of the second virtual item is to automatically detect a target unit and explode, and the second virtual item without the original function cannot automatically detect a target unit and explode.

For example, the second virtual item in different states is displayed in different display manners in the virtual environment. As shown in FIG. 14, step 303 further includes step 3031.

Step 3031: The terminal controls, in response to the second virtual item being located within the first influence range of the first virtual item, that the second virtual item is switched from a first display form corresponding to the effective state to a second display form corresponding to the ineffective state.

The foregoing step 3031 is one example of the terminal switching, in response to the second virtual item being located within the first influence range of the first virtual item, the display of the second virtual item from a first display form to a second display form, the first display form being corresponding to the effective state, and the second display form being corresponding to the ineffective state.

In some embodiments, when displaying that the second virtual item is switched from the effective state to the ineffective state, the terminal switches the display form of the second virtual item, to switch the display of the second virtual item from the first display form corresponding to the effective state to the second display form corresponding to the ineffective state.

In some embodiments, the first display form corresponds to a first display resource, and the second display form corresponds to a second display resource. The terminal may load the first display resource and the second display resource from the server at the start of the game. When the second virtual item is in the effective state, the first display resource is rendered so that the second virtual item is displayed in the first display form; and when the display form of the second virtual item is switched, the second display resource is rendered so that the second virtual item is displayed in the second display form. In some embodiments, the terminal may alternatively only load the first display resource from the server at the beginning, and then load the second display resource from the server when the display form of the second virtual item needs to be switched.

For example, to facilitate the user to distinguish the effective state and the ineffective state of the second virtual item, the second virtual item is displayed in different display forms. For example, the second virtual item in the effective state is displayed in the first display form, and the second virtual item in the ineffective state is displayed in the second display form. A display form refers to at least one of a shape, a color, a special effect, a size, and brightness of the second virtual item displayed in the virtual environment. For example, the second virtual item in the effective state is displayed in color, and the second virtual item in the ineffective state is displayed in gray. In another example, as shown in FIG. 5, the special beam 207 is displayed above the second virtual item (the mine) 204 in the effective state, while as shown in FIG. 6, no special beam is displayed above the second virtual item (the mine) 204 in the ineffective state.

Step 304: The terminal controls, in response to satisfying a restoration condition, that the second virtual item is switched from the ineffective state to the effective state.

One example of the foregoing step 304 of the terminal controlling, in response to satisfying a restoration condition, that the second virtual item is switched from the ineffective state to the effective state is: after controlling the second virtual item to switch from the ineffective state to the effective state, the terminal displays that the second virtual item is switched from the ineffective state to the effective state, and synchronizes second state switching information to the server. The server then synchronizes the information to other terminals, where the second state switching information indicates that the second virtual item is switched from the ineffective state to the effective state.

In another embodiment, the server and each terminal in the game synchronize battle information based on a frame synchronization technology, and the battle information includes but is not limited to: the position of the virtual character, the position of the first virtual item, the position of the second virtual item, user operation information of the user, and the like. When detecting that the restoration condition is met, the server controls the second virtual item to switch from the ineffective state to the effective state, and sends the second state switching information of the second virtual item to each terminal participating in the game. After receiving the second state switching information, each terminal displays that the second virtual item is switched from the ineffective state to the effective state, where the second state switching information indicates that the second virtual item is switched from the ineffective state to the effective state.

For example, the first virtual item can only temporarily make the second virtual item ineffective, and when the restoration condition is met, the second virtual item takes effect again. The restoration condition is used for controlling the second virtual item to switch from the ineffective state to the effective state.

For example, the restoration condition may be an automatically triggered condition, or may be a condition actively triggered by the user. The automatically triggered conditions include: setting a time condition according to a duration for which the second virtual item is in the ineffective state, setting a condition according to virtual characters passing around the second virtual item, and setting a condition according to virtual items used around the second virtual item. For example, the restoration condition may be that the second virtual item is automatically controlled to be restored to the effective state one minute after the second virtual item is in the ineffective state. The restoration condition may be alternatively to automatically control the second virtual item to return to the effective state when a virtual character of a designated camp passes by the second virtual item. The restoration condition may be alternatively to automatically control the second virtual item to return to the effective state when a virtual character uses a designated virtual item near the second virtual item.

For example, the restoration condition may be alternatively a condition actively triggered by another virtual character. For example, the actively triggered condition includes: the virtual character that places the second virtual item remotely controls the state of the second virtual item, to change the second virtual item from the ineffective state to the effective state, or a virtual character of the designated camp arrives at the position of the second virtual item, and manually changes the second virtual item from the ineffective state to the effective state.

Based on the above, according to the method provided in this embodiment, when there is a second virtual item (for example, a mine, a trip mine, or a trap) in the virtual environment, the user can control the main control virtual character to use the first virtual item to make the second virtual item ineffective. The use of the first virtual item does not require the user to accurately aim at the second virtual item, and the purpose of destroying the second virtual item can be achieved only by placing the second virtual item within the influence range of the first virtual item. In addition, the destruction of the second virtual item by the first virtual item is temporary, and the second virtual item may further take effect again when the restoration condition is met. Therefore, a method for destroying the mine with a simple operation is provided, which reduces the operation difficulty of the user to destroy the mine, and improves the man-machine interaction efficiency. A second virtual item is provided. The second virtual item is used to simulate an actual interfering device, and the second virtual item is used to interfere with a first virtual item (an induction mine), so that the first virtual item is temporarily ineffective, thereby authentically simulating the destruction method of jamming mines in practice.

In the method provided in this embodiment, the effective state and the ineffective state of the second virtual item are displayed in different forms on the UI, and the user may determine the current state of the second virtual item through the form of the second virtual item, to further determine whether approaching the second virtual item triggers the second virtual item. In addition, the first virtual item can only temporarily destroy the second virtual item. The second virtual item automatically returns to the effective state after being ineffective for a period of time and continues to produce an effect on a target unit within the influence range.

For example, an exemplary embodiment is provided in which the first virtual item is a throwing item. An exemplary embodiment of determining the first influence range according to the position of the first virtual item is further provided. An exemplary embodiment of setting the restoration condition according to the duration for which the second virtual item is in the ineffective state is further provided.

Figure 15:
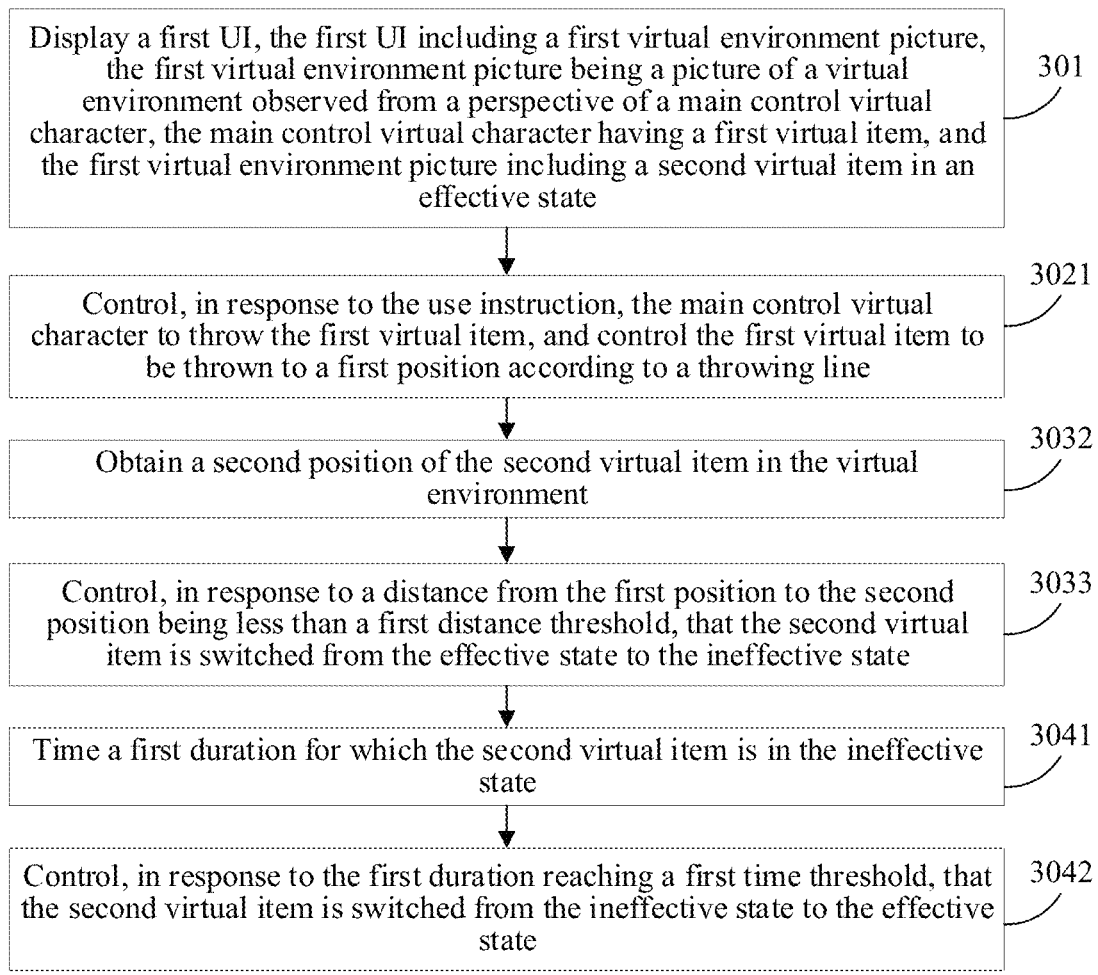
FIG. 15 is a flowchart of a method for displaying a virtual item according to another exemplary embodiment of this application.

FIG. 15 is a flowchart of a method for a virtual character to use a virtual weapon according to another exemplary embodiment of this application. The method is applicable to the first terminal 120 or the second terminal 160 in the computer system shown in FIG. 1 or another terminal in the computer system. A client of an application supporting a virtual environment is installed on the terminal. The terminal is an exemplary description of the computer device. The difference from the embodiment shown in FIG. 7 is that step 302 includes step 3021, step 303 further includes steps 3032 and 3033, and step 304 further includes steps 3041 and 3042.

Step 3021: The terminal controls, in response to the use instruction, the main control virtual character to throw the first virtual item, and controls the first virtual item to be thrown to a first position according to a throw trajectory.

The foregoing step 3021 is one example of the terminal controlling, in response to the use instruction, the target virtual character to throw the first virtual item, and controlling the first virtual item to be thrown to a first position according to a throw trajectory.

Figure 16:
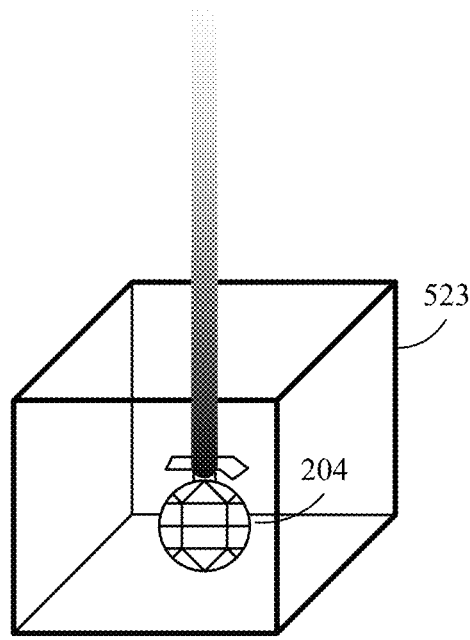
FIG. 16 is a schematic diagram of a collision box of a method for displaying a virtual item according to another exemplary embodiment of this application.

For example, when the first virtual item is a throwing item, such as a grenade, a flash grenade, a smoke grenade, or an electromagnetic pulse, the main control virtual character uses the first virtual item by throwing the first virtual item. When the first virtual item hits somewhere, the first virtual item produces a corresponding effect, or, after the first virtual item hits the ground, the first virtual item produces an effect after a period of time. That is, the first virtual item may be like a grenade, which explodes immediately when the grenade is thrown and hits an object, or may be like a smoke grenade, which generates smoke after a while after being thrown. For example, when the first virtual item is a delayed effective item, the first virtual item further has a collision and rebound capability. When the first virtual item is thrown out, if the first virtual item hits an object, the first virtual item is bounced, until the first virtual item can stop at the first position in the virtual environment. For example, a collision box is set for each object in the virtual environment, and the collision box is used to detect the collision on the object. For example, as shown in FIG. 16, a collision box 523 is set outside the second virtual item (the mine) 204. When the main control virtual character throws the first virtual item and the first virtual item collides with the collision box 523, the collision box 523 may obtain collision information of the current collision. The collision information includes at least one of a collision point, a speed of the first virtual item when the collision occurs, a movement direction, a plane where the collision point is located on the collision box, and a normal vector of the plane. The client determines, according to the collision information of the current collision, a bounce path after the first virtual item is bounced.

For example, the first virtual item may be thrown along the throw trajectory. The throw trajectory is calculated by the client according to at least one parameter selected from a perspective of the main control virtual character when the user issues the use instruction, a position of the main control virtual character, and a throwing direction, a starting point for throwing, a throwing force, and a throwing speed of the first virtual item. For example, when the main control virtual character is currently located at (0, 0, 0), the throwing starting point is (0, 0, 10) of the hand of the main control virtual character, the throwing direction is (1, 1, 1), and the throwing speed is 5 m/s, the server calculates the throw trajectory (a parabola) of the first virtual item according to the parameters. For example, the throwing direction is obtained according to a current perspective (a pitch angle and horizontal deflection angle) of the main control virtual character, and the throwing speed and the throwing force may be obtained according to a throwing operation of the first user. For example, the throwing force is determined according to a time length for which the first user presses the firing control, and a longer press time indicates a larger force and a farther throw. For example, the throw trajectory of the first virtual item may be alternatively calculated according to parameters such as a mass and a gravity acceleration of the first virtual item. For example, the throw trajectory may be alternatively a straight line from the throwing starting point to the landing point. For example, when the thrown first virtual item hits an inclined plane or a vertical surface in the virtual environment, the throw trajectory further includes a bounce path after the first virtual item bounces.

For example, both the client and the server calculate the throw trajectory of the first virtual item. The client may throw the first virtual item according to a path result calculated by the client, or may throw the first virtual item according to a calculation result of the server. For example, the client throws the first virtual item according to the throw trajectory calculated by the client.

For example, the first virtual item arrives at the first position after being thrown along the throw trajectory. The first position is a position where the first virtual item finally stops in the virtual environment after being thrown, that is, the speed of the first virtual item at the first position is 0.

For example, as shown in FIG. 5, in response to the use instruction, the client controls the main control virtual character to throw the first virtual item 506 according to the throw trajectory 524, and the first virtual item 506 finally reaches the first position 525.

Step 3032: The terminal obtains a second position of the second virtual item in the virtual environment.

Figure 17:
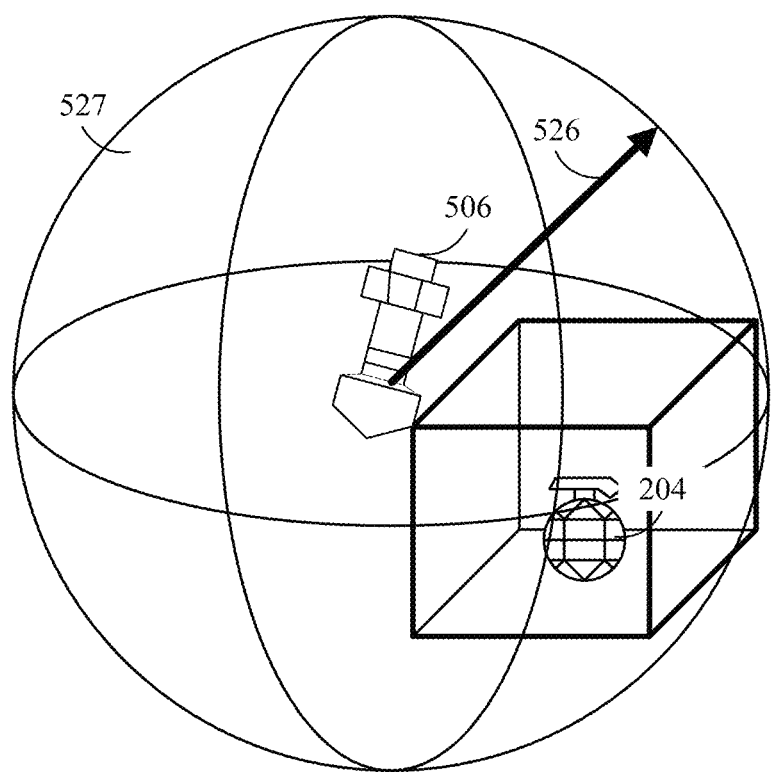
FIG. 17 is a schematic diagram of a first influence range of a method for displaying a virtual item according to another exemplary embodiment of this application.

For example, the first influence range of the first virtual item is a spherical range with the position of the first virtual item as a center and a first distance threshold as a radius. The influence radius may be any value greater than 0. For example, as shown in FIG. 17, the first virtual item 506 is located at the first position, and the second virtual item 204 is located at the second position. The figure shows a first influence range 527 of the first virtual item 506, and the first influence range 527 is a spherical range with the first position as a center and a first distance threshold 526 as a radius. It can be seen from the figure that the second position is located within the first influence range 527.

For example, when the main control virtual character uses the first virtual item to cause the first virtual item to reach the first position in the virtual environment, the client obtains positions of all target units in the virtual environment. A target unit is a target object that the first virtual item can act on, and the target object may include other virtual items except the first virtual item, or other virtual characters except the target virtual character. For example, the target unit is at least one of all placed weapons placed in the virtual environment, all virtual characters in the virtual environment, virtual characters of the enemy camp, and placed weapons placed by virtual characters of the enemy camp. That is, the first virtual item may produce an effect on the placed weapon (the second virtual item), and may also produce an effect on the virtual character. For example, the client obtains positions of all target units that the first virtual item may act on, and determines distances between the target units and the first position respectively, to determine whether the first virtual item can produce an effect on the target units.

Step 3033: The terminal controls, in response to a distance from the first position to the second position being less than a first distance threshold, that the second virtual item is switched from the effective state to the ineffective state.

The foregoing step 3033 is one example of the terminal displaying, in response to a distance from the first position to the second position being less than a first distance threshold, that the second virtual item is switched from the effective state to the ineffective state. In other words, after controlling the second virtual item to switch from the effective state to the ineffective state, the terminal displays that the second virtual item is switched from the effective state to the ineffective state, and sends first state switching information to the server. The server then synchronizes the first state switching information to other terminals, where the first state switching information indicates that the second virtual item is switched from the effective state to the ineffective state.

In some embodiments, the server and each terminal in the game synchronize battle information based on a frame synchronization technology, and the battle information includes but is not limited to: the position of the virtual character, the position of the first virtual item, the position of the second virtual item, user operation information of the user, and the like. When detecting that the distance from the first position to the second position is less than the first distance threshold, the server controls the second virtual item to switch from the effective state to the ineffective state, and sends the first state switching information to the terminal. After receiving the first state switching information, the terminal displays that the second virtual item is switched from the effective state to the ineffective state, where the first state switching information indicates that the second virtual item is switched from the effective state to the ineffective state.

If a straight-line distance between the second virtual item and the first virtual item is less than the first distance threshold, the client determines that the second virtual item is located within the first influence range of the first virtual item, and determines that the first virtual item produces an effect on the second virtual item: controlling the second virtual item to switch from the effective state to the ineffective state.

Figure 18:
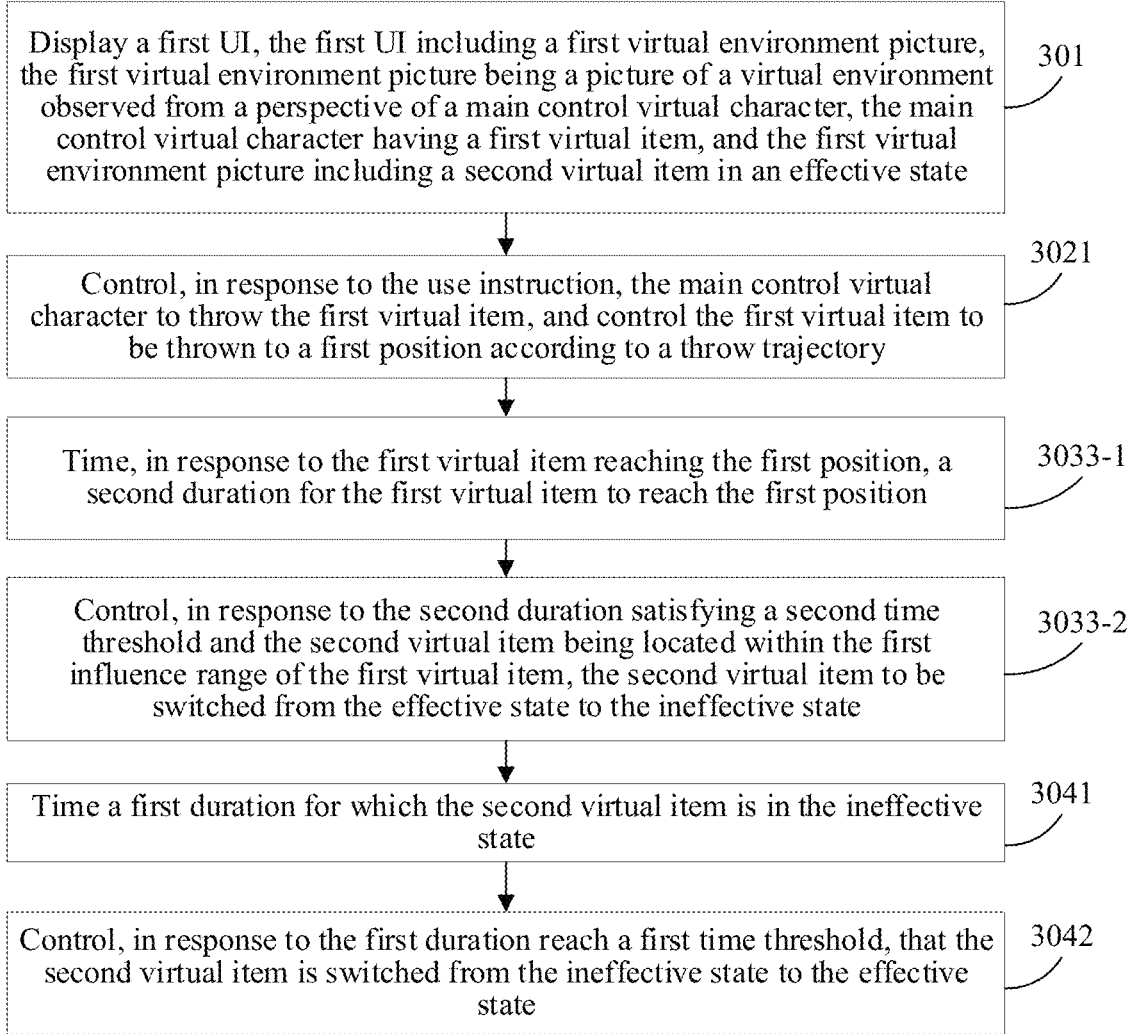
FIG. 18 is a flowchart of a method for displaying a virtual item according to another exemplary embodiment of this application.

For example, as shown in FIG. 18, before step 3033, step 3033-1 is further included, and step 3033 further includes step 3033-2.

Step 3041: The terminal times a first duration for which the second virtual item is in the ineffective state.

For example, the restoration condition is a condition set according to the first duration for which the second virtual item is in the ineffective state. For example, after the main control virtual character uses the first virtual item to make the second virtual item ineffective, the second virtual item may automatically return to normal after a period of time. Therefore, after the second virtual item enters the ineffective state, the client starts to record the first duration for which the second virtual item in the ineffective state, to determine, according to the first duration, when the second virtual item changes from the ineffective state to the effective state.

Step 3042: The terminal controls, in response to the first duration reaching a first time threshold, that the second virtual item is switched from the ineffective state to the effective state.

The foregoing step 3042 is one example of the terminal displaying, in response to the first duration reaching a first time threshold, that the second virtual item is switched from the ineffective state to the effective state. In other words, after the terminal side completes the timing of the first duration, if the first duration satisfies the first time threshold, it is displayed that the second virtual item is switched from the ineffective state to the effective state, and second state switching information is sent to the server. The server then synchronizes the second state switching information to other terminals participating in the game, where the second state switching information indicates that the second virtual item is switched from the ineffective state to the effective state.

In some embodiments, the server side times the first duration for which the second virtual item is in the ineffective state, and synchronizes timing information for the first duration to the terminal. When detecting that the first duration satisfies the first time threshold, the server controls the second virtual item to switch from the ineffective state to the effective state, and sends the second state switching information to all terminals participating in the game. After receiving the second state switching information, the terminals display that the second virtual item is switched from the ineffective state to the effective state, where the second state switching information indicates that the second virtual item is switched from the ineffective state to the effective state.

The first time threshold is a maximum time for which the first virtual item can make the second virtual item ineffective. When the first duration reaches the first time threshold, the client automatically controls the second virtual item to change from the ineffective state to the effective state.

For example, when the second virtual item is in an ineffective state, the user may further control the main control virtual character to completely destroy or dismantle the second virtual item. For example, when the second virtual item is in the ineffective state, the second virtual item does not detonate when the main control virtual character approaches the second virtual item. In this case, the main control virtual character may take the opportunity to dismantle the second virtual item.

Based on the above, according to the method provided in this embodiment, the timing starts after the second virtual item becomes ineffective, and when the timing reaches a specified time, the second virtual item is automatically controlled to return from the ineffective state to the effective state, so that the second virtual item continues to produce an effect on a target unit within the influence range, and the first virtual item can only temporarily destroy the second virtual item.

In the method provided in this embodiment, the first virtual item is a throwing item, and when receiving the use instruction for the first virtual item, the client controls the main control virtual character to throw the first virtual item to the first position, so that the client determines the influence range of the first virtual item according to the first position. In this way, the user can throw the first virtual item from a long distance to destroy the second virtual item in the distance, which simplifies the operation of the user to destroy the second virtual item, and improves the man-machine interaction efficiency.

In the method provided in this embodiment, the client determines the influence range of the first virtual item according to the first position of the first virtual item, and controls the first virtual item to produce an effect on the second virtual item when the position of the second virtual item is within the influence range of the first virtual item, to make the second virtual item ineffective, which simplifies the operation of the user to destroy the second virtual item, and improves the man-machine interaction efficiency.

In the method provided in this embodiment, after the first virtual item hit the ground for a period of time, the second virtual item is controlled to be ineffective, so that the first virtual item has a specific delay time to take effect, which accurately simulates the situation in reality of using a pulse weapon to interfere with the mine and make the mine ineffective.

For example, the second virtual item in the effective state is used to periodically detect a target unit located in the second influence range, and produce an effect on the target unit. This application further provides an exemplary embodiment of controlling the second virtual item to be ineffective. This application further provides a method for detecting a target unit by a second virtual item.

Figure 19:
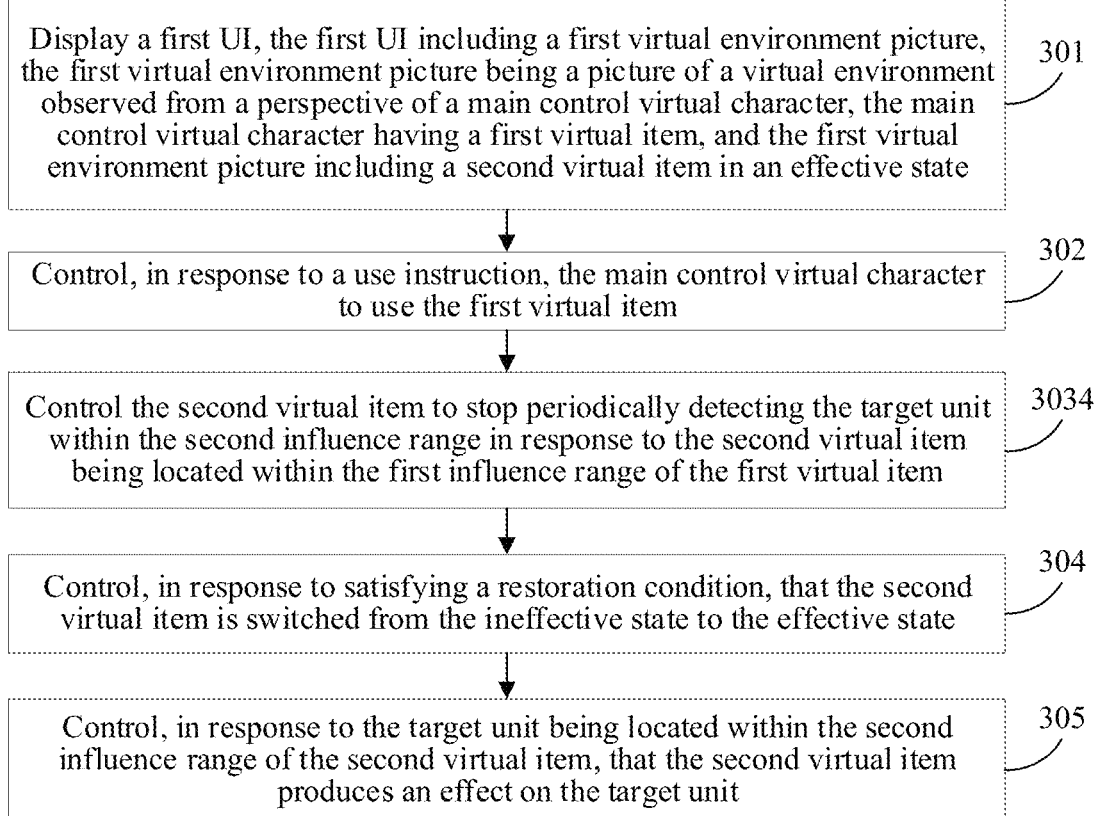
FIG. 19 is a flowchart of a method for displaying a virtual item according to another exemplary embodiment of this application.

FIG. 19 is a flowchart of a method for displaying a virtual item according to another exemplary embodiment of this application. The method is applicable to the first terminal 120 or the second terminal 160 in the computer system shown in FIG. 1 or another terminal in the computer system. A client of an application supporting a virtual environment is installed on the terminal. The terminal is an exemplary description of the computer device. Based on the embodiment shown in FIG. 7, step 303 further includes step 3034, and after step 304, step 305 is further included:

Step 3034: The terminal controls the second virtual item to stop periodically detecting the target unit within the second influence range in response to the second virtual item being located within the first influence range of the first virtual item.

The foregoing step 3034 is one example of the terminal controlling the second virtual item to stop periodically detecting the target object within the second influence range in response to the second virtual item being located within the first influence range of the first virtual item. In other words, after controlling the second virtual item to stop periodically detecting the target object located in the second influence range, the terminal sends detection stop indication information to the server. The server then synchronizes the detection stop indication information to other terminals participating in the game, where the detection stop indication information indicates that the second virtual item stops periodically detecting the target object located in the second influence range.

In some embodiments, the server and each terminal in the game synchronize battle information based on a frame synchronization technology, and the battle information includes but is not limited to: the position of the virtual character, the position of the first virtual item, the position of the second virtual item, user operation information of the user, and the like. When detecting that the second virtual item is located in the first influence range of the first virtual item, the server controls the second virtual item to stop periodically detecting the target object located in the second influence range, and sends detection stop indication information to all terminals participating in the game. After the terminal receives the detection stop indication information, the second virtual item is caused to stop periodically detecting the target object located in the second influence range, where the detection stop indication information indicates that the second virtual item stops periodically detecting the target object located in the second influence range.

Figure 20:
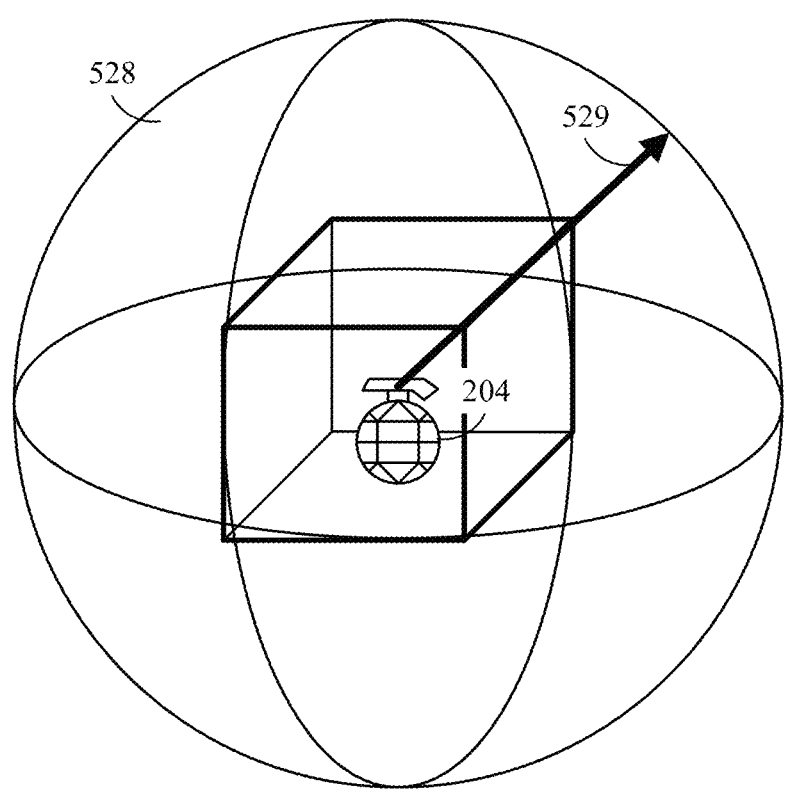
FIG. 20 is a schematic diagram of a second influence range of a method for displaying a virtual item according to another exemplary embodiment of this application.

For example, the second virtual item in the effective state produces an effect on the target unit within the second influence range, that is, the second virtual item in the effective state is used to periodically detect a target object located within the second influence range and produce an effect on the target object. The second influence range is determined according to the position of the second virtual item. For example, the second influence range is a spherical range with the second position of the second virtual item as a center and a second distance threshold as a radius. For example, as shown in FIG. 20, a second influence range 528 is a spherical range with a position of a second virtual item as a center and a second distance threshold 529 as a radius. When a target unit is located within the spherical range, the second virtual item is triggered to produce an effect.

For example, after the second virtual item is placed in the virtual environment, the client periodically detects distances between all target units in the virtual environment and the second virtual item. A target unit refers to a unit (that is, a target object) that the second virtual item can act on, for example, a virtual item, a virtual weapon, a virtual vehicle, a virtual character, or a virtual building. For example, the target unit of the second virtual item is a virtual character, and the virtual character may be a virtual character controlled by another client, or a virtual character controlled by a server. When the target unit of the second virtual item is a virtual character of an enemy camp, the client periodically obtains positions of all virtual characters of the enemy camp, and calculates a distance between each virtual character of the enemy camp and the second virtual item, to determine whether the target unit enters the second influence range of the second virtual item.

When the second virtual item enters the ineffective state, the client stops detecting the target units within the second influence range. That is, the client no longer obtains the positions of the target units of the second virtual item, or calculates the distance between each target unit and the second virtual item, or detonate the second virtual item.

For example, the second virtual item may be an item that is triggered once, or an item that can be triggered a plurality of times. For example, the second virtual item may be a mine. The mine disappears from the virtual environment when a target unit detonates the mine. The second virtual item may be alternatively an electrified current trap. When a target unit triggers the current trap, the target unit is electrocuted, but the current trap does not disappear and may be triggered again by the next target unit.

Step 305: The terminal controls, in response to the target unit being located within the second influence range of the second virtual item, that the second virtual item produces an effect on the target unit.

The foregoing step 305 is one example of the terminal displaying, in response to the target object being located within the second influence range of the second virtual item, an effect on the target object produced according to the second virtual item. In other words, after controlling the second virtual item to produce an effect on the target object, the terminal sends control influence indication information to the server. The server then synchronizes the control influence information to other terminals participating in the game, where the control influence information indicates that the second virtual item produces an effect on the target object.

In some embodiments, the server and each terminal in the game synchronize battle information based on a frame synchronization technology, and the battle information includes but is not limited to: the position of the virtual character, the position of the first virtual item, the position of the second virtual item, user operation information of the user, and the like. When detecting that the target object is within the second influence range of the second virtual item, the server controls the second virtual item to produce an effect on the target object, and sends control influence information to all terminals participating in the game. After receiving the control influence information, the terminal displays an effect on the target object produced by the second virtual item, where the control influence information indicates that the second virtual item produces an effect on the target object.

The effect includes at least one of an activity limitation of the target unit or a reduction in a hit point value of the target unit, and the activity limitation of the target unit includes at least one of movement speed reduction, line-of-sight obstruction, slow activity, control manner change, item use limitation, or movement manner limitation of the target unit.

In other words, the effect includes at least one of an activity limitation of the target object or a reduction in a hit point value of the target object, and the activity limitation of the target object includes at least one of movement speed reduction, line-of-sight obstruction, slow activity, control manner change, item use limitation, or movement manner limitation of the target object.

For example, the second virtual item is a damaging item, that is, the second virtual item mainly reduces the hit point value of the target unit. The amount of the reduced hit point value may be determined according to a distance between the target unit and the second virtual item, and a closer distance indicates a greater reduced hit point value. When the hit point value of the target unit is less than a hit point threshold, the target unit dies, where the hit point threshold is any value greater than or equal to 0, for example, the hit point threshold is 0.

For example, the second virtual item may further limit the activity of the target unit. For example, some state values of the target unit are changed, such as the movement speed, a blood regeneration speed, and aiming accuracy. For example, a use permission of the target unit is changed, for example, incapability of opening the scope, incapability of squatting, incapability of accelerated movement, incapability of using items, incapability of firing, incapability of switching perspectives, or incapability of transmitting signals. For example, when the target unit is a second virtual character controlled by another client, part of the picture or control is occluded on the UI of the client corresponding to the second virtual character, which affects the control of the second virtual character by the user. For example, the UI control is occluded with mosaics on the UI, so that the user cannot see the position of the UI control.

Figure 21:
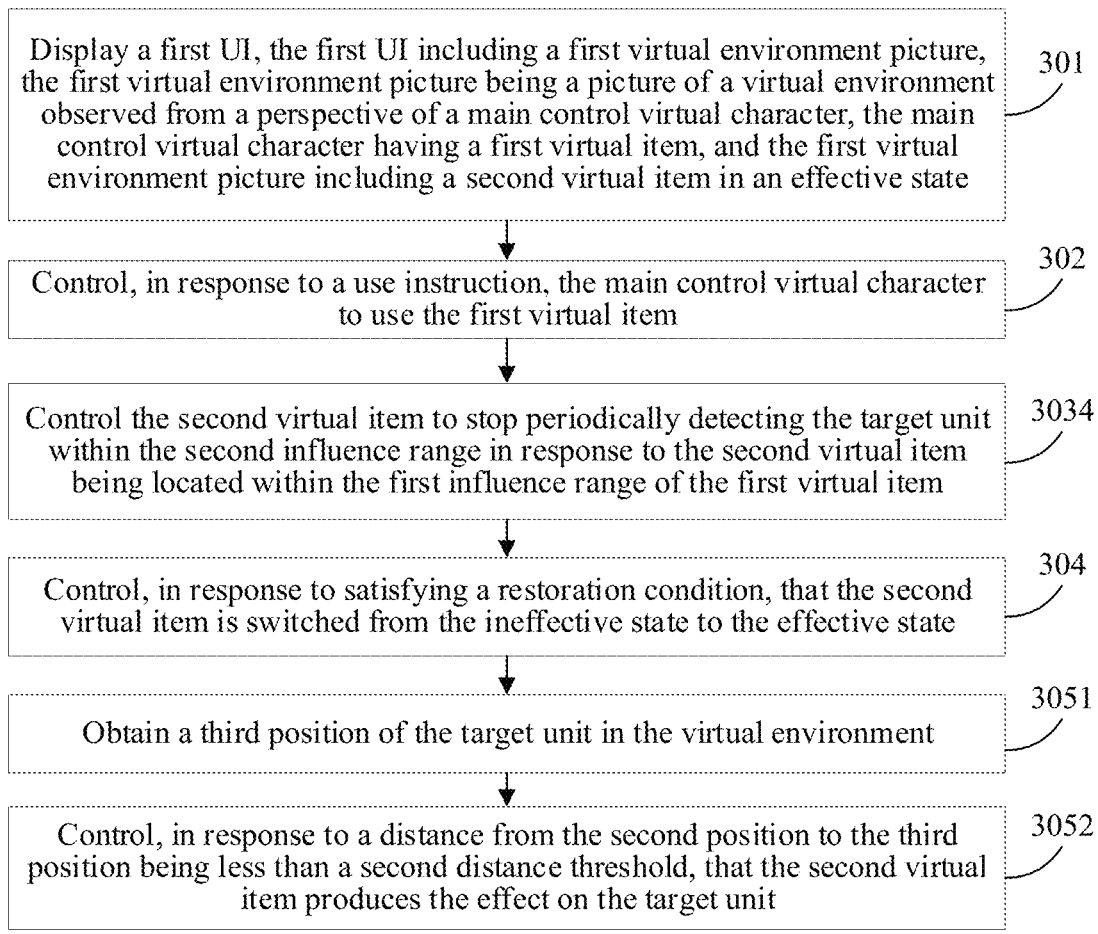
FIG. 21 is a flowchart of a method for displaying a virtual item according to another exemplary embodiment of this application.

For example, an exemplary embodiment in which the client detects a target unit located in a second influence range is further provided. As shown in FIG. 21, a target object being the target unit is taken as an example for illustration. Step 305 further includes step 3051 and step 3052.

Step 3051: The terminal obtains a third position of the target unit in the virtual environment.

The foregoing step 3051 is one example of the terminal obtaining a third position of the target object in the virtual environment.

For example, the client periodically obtains positions of all target units of the second virtual item in the virtual environment, and periodically detects distances between all the target units and the second virtual item.

Step 3052: The terminal controls, in response to a distance from the second position to the third position being less than a second distance threshold, that the second virtual item produces the effect on the target unit.

The foregoing step 3052 is one example of the terminal displaying, in response to a distance from the second position to the third position being less than a second distance threshold, that the second virtual item produces the effect on the target object. In other words, after controlling the second virtual item to produce an effect on the target object, the terminal sends control influence indication information to the server. The server then synchronizes the control influence information to other terminals participating in the game, where the control influence information indicates that the second virtual item produces an effect on the target object.

In some embodiments, the server and each terminal in the game synchronize battle information based on a frame synchronization technology, and the battle information includes but is not limited to: the position of the virtual character, the position of the first virtual item, the position of the second virtual item, user operation information of the user, and the like. When detecting that a distance from the second position to the third position is less than a second distance threshold, the server controls the second virtual item to produce an effect on the target object, and sends control influence information to all terminals participating in the game. After receiving the control influence information, the terminal displays that the second virtual item produces an effect on the target object, where the control influence information indicates that the second virtual item produces an effect on the target object.

When the distance between the target unit and the second virtual item is less than the second distance threshold, it is determined that the target unit is within the second influence range of the second virtual item, it is determined that the target unit triggers the second virtual item, and the second virtual item is controlled to produce an effect on the target unit.

Based on the above, according to the method provided in this embodiment, the client periodically detects whether the target unit is within the influence range of the second virtual item, and controls the second virtual item to produce an effect on the target unit when the target unit is within the influence range of the second virtual item. Compared with the method of triggering the second virtual item when the target unit enters the influence range, the periodic detection can resolve the following problems: The target unit enters the influence range when the second virtual item becomes ineffective, and after the second virtual item becomes effective again, the target unit cannot trigger the second virtual item.

In the method provided in this embodiment, when the target unit is within the influence range of the second virtual item, the second virtual item produces an effect on the target unit. The effect includes but is not limited to an activity limitation of the target unit or a reduction in a hit point value of the target unit, so that the second virtual item can authentically simulate weapons such as mines and traps.

According to the method provided in the embodiments, after the first virtual item hits the second virtual character, the hit point value of the second virtual character is not reduced too much, but the normal activities of the second virtual character can be affected, for example, movement speed reduction, line-of-sight obstruction, slow activity, control manner change, item use limitation, or movement manner limitation of the second virtual character. Therefore, the first virtual item can also act on a virtual character, and the use manners of the first virtual item are expanded.

In the method provided in this embodiment, the position of the target unit in the virtual environment is obtained, a straight-line distance between the target unit and the position of the second virtual item is calculated, and whether the target unit enters the influence range of the second virtual item is determined according to the straight-line distance. When the target unit enters the influence range of the second virtual item, the second virtual item is controlled to produce an effect on the target unit, so that the second virtual item can authentically simulate weapons such as mines and traps.

Figure 22:
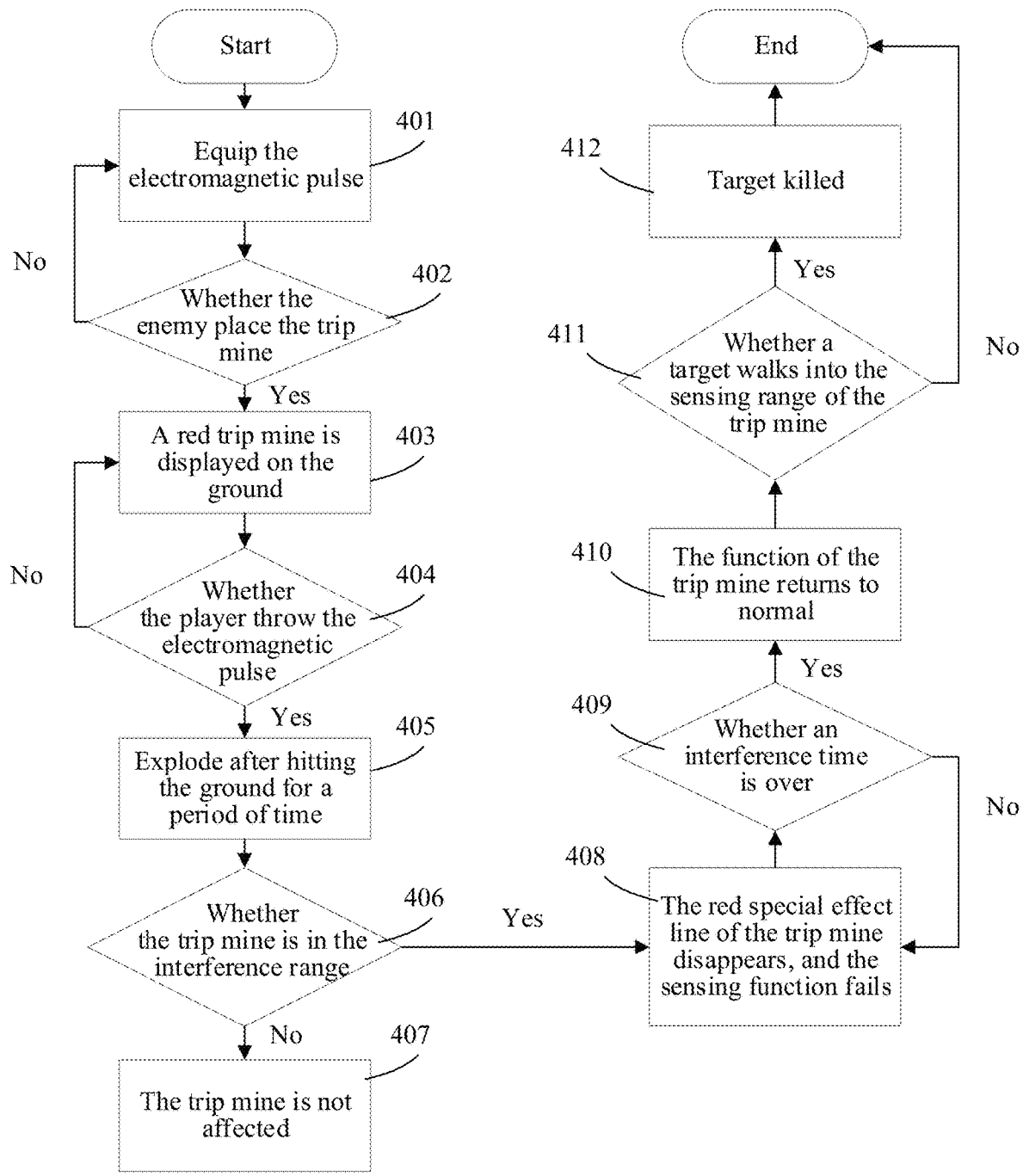
FIG. 22 is a flowchart of a method for displaying a virtual item according to another exemplary embodiment of this application.

FIG. 22 is a flowchart of a method for displaying a virtual item according to another exemplary embodiment of this application. The method is applicable to the first terminal 120 or the second terminal 160 in the computer system shown in FIG. 1 or another terminal in the computer system. A client supporting a virtual environment runs on the terminal. The terminal is an exemplary description of the computer device. The method includes the following steps:

Step 401: The user is equipped with an electromagnetic pulse (a first virtual item) as a tactical weapon before entering the game.

For example, the electromagnetic pulse is a type of first virtual item.

Step 402: The client determines whether a virtual character of an enemy camp places a trip mine (a second virtual item) in the virtual environment, and if so, step 403 is performed, or otherwise step 401 is performed.

Step 403: The client displays a trip mine with a red special effect line on the ground of the virtual environment.

The red special effect line indicates that the trip mine is placed by the virtual character of the enemy camp, and the trip mine is in the effective state.

Step 404: The client determines whether the user throws the electromagnetic pulse, and if so, step 405 is performed, or otherwise step 403 is performed.

Step 405: The client controls the electromagnetic pulse to explode after hitting the ground for a period of time.

Step 406: The client determines whether the trip mine is within an interference range (a first influence range) of the electromagnetic pulse, and if so, step 408 is performed, or otherwise step 407 is performed.

Step 407: The client determines that the electromagnetic pulse thrown by a main control virtual character does not affect the trip mine.

Step 408: The client determines that the electromagnetic pulse thrown by the main control virtual character interferes with the trip mine, controls the red special effect line of the trip mine to disappear, and controls the sensing function of the trip mine to fail.

The disappearance of the red special effect line indicates that the trip mine is in the ineffective state. The trip mine in the ineffective state does not sense a target unit entering a second influence range.

Step 409: The client determines whether an interference time of the electromagnetic pulse is over, and if so, step 410 is performed, or otherwise step 408 is performed.

Step 410: The client controls the function of the trip mine to return to normal.

Step 411: The client determines whether a target walks into the sensing range (the second influence range) of the trip mine, and if so, step 412 is performed, or otherwise the process ends.

Step 412: The client determines that the target triggers the trip mine and controls the trip mine to automatically explode, and the target is killed by the trip mine.

Based on the above, according to the method provided in the embodiments, a first virtual item dedicated to destroying mines is provided, and when a virtual character uses the first virtual item on a mine, the function of the mine is interfered with to temporarily make the mine ineffective, so that the user does not need to destroy the mine by attacking the mine for a plurality of times, thereby preventing the user from spending too much time in destroying the mine, and simplifying the process for the user to destroy the mine. The user operation is simplified, and the man-machine interaction efficiency is improved.

The foregoing method is described based on a game application scenario in the foregoing embodiments, and the following is an exemplary description of the foregoing method based on a military simulation application scenario.

The simulation technology is a model technology in which a system behavior or process is reflected by using software and hardware through an experiment of simulating a real world.

A military simulation program is a program specially constructed for military application by using the simulation technology, which performs quantitative analysis on battle elements such as sea, air, and land, weapon equipment performance, battle actions, and the like, to accurately simulate a battlefield environment, and present a battlefield situation, thereby implementing battle system evaluation and decision aids.

In an example, soldiers establish a virtual battlefield on a terminal on which the military simulation program is located, and fight in teams. The soldier controls a virtual object in a virtual battlefield environment to perform at least one operation of standing, squatting, sitting down, lying on the back, lying prone, lying on the side, walking, running, climbing, driving, shooting, throwing, attacking, being injured, detecting, close combat and other actions in the virtual battlefield environment. The virtual battlefield environment includes at least one of the following nature forms: a plain, a mountain, a plateau, a basin, a desert, a river, a lake, a sea, vegetation, and site forms of a building, a vehicle, ruins, a training ground, and the like. The virtual object includes a virtual person, a virtual animal, a cartoon person, or the like. Each virtual object owns a shape and size in a 3D virtual environment, and occupies some space in the 3D virtual environment.

Based on the foregoing situation, in an example, a soldier A controls a virtual object a to move in the virtual environment. When the soldier A finds that there are mines placed by the enemy in the virtual environment, the soldier may control the virtual object a to use the first virtual item (the electromagnetic pulse), so that the first virtual item interferes with a laser trip mine of the enemy, to temporarily make the laser trip mine ineffective. For example, when an interference time of the first virtual item ends, the laser trip mine returns to normal. The soldier A may dismantle the laser trip mine when the laser trip mine is interfered with.

Based on the above, in this embodiment, the foregoing method for controlling a virtual character is applied to a military simulation program. When a soldier finds a laser trip mine placed by the enemy in the virtual environment, the soldier may use an electromagnetic pulse to temporarily interfere with the laser trip mine, thereby authentically simulating a scenario of interfering with a laser trap of the enemy in the battlefield, so that soldiers obtain better training.

Apparatus embodiments of this application are described below. For details that are not described in detail in the apparatus embodiments, reference may be made to the corresponding records in the foregoing method embodiments, and details are not described herein again.

Figure 23:
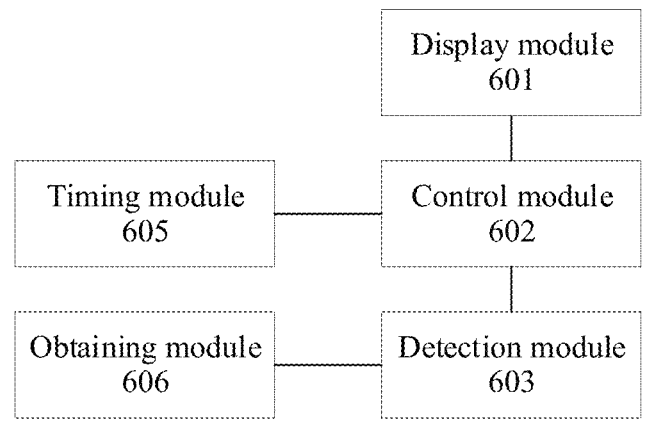
FIG. 23 is a schematic diagram of an apparatus for displaying a virtual item according to another exemplary embodiment of this application.

FIG. 23 is a schematic structural diagram of an apparatus for displaying a virtual item according to an exemplary embodiment of this application. The apparatus may be implemented as an entire terminal or a part of a terminal by using software, hardware, or a combination thereof. The apparatus includes:

a display module 601, configured to display a first UI, the first UI including a first virtual environment picture, the first virtual environment picture being a picture of a virtual environment observed from a perspective of a main control virtual character, the main control virtual character having a first virtual item, and the first virtual environment picture including a second virtual item in an effective state, where the display module 601 is further configured to display the first virtual environment picture, the first virtual environment picture displaying the second virtual item in the effective state;

a control module 602, configured to control, in response to a use instruction, the main control virtual character to use the first virtual item, where the control module 602 is further configured to control, in response to the use instruction, a target virtual character to use the equipped first virtual item; and a detection module 603, configured to detect that the second virtual item is located within a first influence range of the first virtual item, where the control module 602 is further configured to control, in response to the second virtual item being located within a first influence range of the first virtual item, that the second virtual item is switched from the effective state to an ineffective state;

the control module 602 is further configured to display, in response to the second virtual item being located within a first influence range of the first virtual item, that the second virtual item is switched from the effective state to an ineffective state;

the control module 602 is further configured to control, in response to satisfying a restoration condition, that the second virtual item is switched from the ineffective state to the effective state; and the control module 602 is further configured to display, in response to satisfying a restoration condition, that the second virtual item is switched from the ineffective state to the effective state.

In one embodiment, the control module 602 is further configured to control, in response to the second virtual item being located within the first influence range of the first virtual item, that the second virtual item is switched from a first display form corresponding to the effective state to a second display form corresponding to the ineffective state; and the control module 602 is further configured to switch, in response to the second virtual item being located within the first influence range of the first virtual item, the display of the second virtual item from a first display form to a second display form, the first display form being corresponding to the effective state, and the second display form being corresponding to the ineffective state.

In some embodiments, the apparatus further includes:

a timing module 605, configured to time a first duration for which the second virtual item is in the ineffective state, where the control module 602 is further configured to control, in response to the first duration reaching a first time threshold, that the second virtual item is switched from the ineffective state to the effective state; and the control module 602 is further configured to display, in response to the first duration reaching a first time threshold, that the second virtual item is switched from the ineffective state to the effective state.

In one embodiment, the control module 602 is further configured to control, in response to the use instruction, the main control virtual character (that is, the target virtual character) to throw the first virtual item, and control the first virtual item to be thrown to a first position according to a throw trajectory.

In some embodiments, the apparatus further includes:

an obtaining module 606, configured to obtain a second position of the second virtual item in a virtual environment, where the detection module 603 is further configured to detect that a distance from the first position to the second position is less than a first distance threshold;

the control module 602 is further configured to control, in response to a distance from the first position to the second position being less than a first distance threshold, that the second virtual item is switched from the effective state to the ineffective state; and the control module 602 is further configured to display, in response to a distance from the first position to the second position being less than a first distance threshold, that the second virtual item is switched from the effective state to the ineffective state.

In some embodiments, the apparatus further includes:

a timing module 605, configured to time, in response to the first virtual item reaching the first position, a second duration for the first virtual item at the first position, where the control module 602 is further configured to control, in response to the second duration satisfying a second time threshold and the second virtual item being located within the first influence range of the first virtual item, that the second virtual item is switched from the effective state to the ineffective state; and the control module 602 is further configured to display, in response to the second duration satisfying a second time threshold and the second virtual item being located within the first influence range of the first virtual item, that the second virtual item is switched from the effective state to the ineffective state.

In one embodiment, the second virtual item in the effective state is configured to periodically detect a target unit (that is, a target object) located in a second influence range and produce an effect on the target unit (that is, the target object); and the control module 602 is further configured to control the second virtual item to stop periodically detecting the target unit within the second influence range in response to the second virtual item being located within the first influence range of the first virtual item, that is, the second virtual item stops periodically detecting the target object within the second influence range in response to the second virtual item being located within the first influence range of the first virtual item.

In some embodiments, the apparatus further includes:

the detection module 603 is further configured to detect that the target unit is located within the second influence range of the second virtual item;

the control module 602 is further configured to control, in response to the target unit being located within the second influence range of the second virtual item, that the second virtual item produces an effect on the target unit, that is, the control module 602 is further configured to display, in response to the target object being located within a second influence range of the second virtual item, that the second virtual item produces an effect on the target object, where the effect includes at least one of an activity limitation of the target unit (that is, the target object) or a reduction in a hit point value of the target unit (that is, the target object), and the activity limitation of the target unit (that is, the target object) includes at least one of movement speed reduction, line-of-sight obstruction, slow activity, control manner change, item use limitation, or movement manner limitation of the target unit (that is, the target object).

In one embodiment, the second virtual item is located at a second position in the virtual environment; and the apparatus further includes:

an obtaining module 606, configured to obtain a third position of the target unit (that is, the target object) in the virtual environment, where the detection module 603 is further configured to detect that a distance from the second position to the third position is less than a second distance threshold; and the control module 602 is further configured to control, in response to a distance from the second position to the third position being less than a second distance threshold, that the second virtual item produces the effect on the target unit, that is, the control module 602 is further configured to display, in response to a distance from the second position to the third position being less than a second distance threshold, that the second virtual item produces the effect on the target object.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 24:
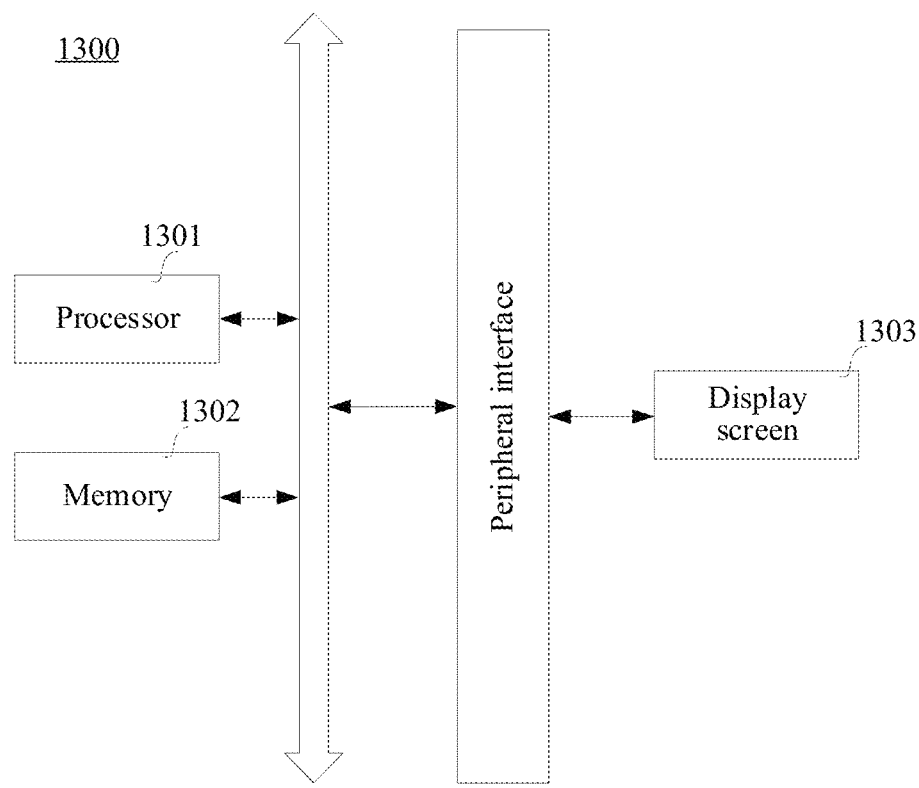
FIG. 24 is a schematic structural diagram of a computer device according to an exemplary embodiment of this application.

FIG. 24 is a structural block diagram of a computer device 1300 according to an exemplary embodiment of this application. The computer device 1300 may be a portable mobile terminal, such as a smartphone, a tablet computer, a smart speaker, a smartwatch, an MP3 player, or an MP4 player. The computer device 1300 may be further referred to as another name such as user equipment or a portable terminal.

Generally, the computer device 1300 includes a processor 1301 and a memory 1302.

The processor 1301 may include one or more processing cores, for example, a 4-core processor or an 8-core processor. The processor 1301 may be implemented in at least one hardware form of a digital signal processor (DSP), a field programmable gate array (FPGA), and a programmable logic array (PLA). The processor 1301 may alternatively include a main processor and a coprocessor. The main processor is configured to process data in an awake state, also referred to as a central processing unit (CPU). The coprocessor is a low-power processor configured to process data in a standby state. In some embodiments, the processor 1301 may be integrated with a graphics processing unit (GPU). The GPU is configured to render and draw content that needs to be displayed on a display. In some embodiments, the processor 1301 may further include an artificial intelligence (AI) processor. The AI processor is configured to process a computing operation related to machine learning.

The memory 1302 may include one or more computer-readable storage media. The computer-readable storage medium may be tangible and non-transient. The memory 1302 may further include a high-speed random access memory (RAM), and a non-volatile memory such as one or more magnetic disk storage devices and a flash storage device. In some embodiments, the non-transient computer-readable storage medium in the memory 1302 is configured to store at least one instruction. The at least one instruction is executed by the processor 1301 to perform the method for displaying a virtual item provided in this application.

In some embodiments, the computer device 1300 may further include a display screen 1303.

The display screen 1303 is configured to display a UI. The UI may include a graph, text, an icon, a video, and any combination thereof. The display screen 1303 also has a capability of collecting a touch signal on or above a surface of the display screen 1303. The touch signal may be inputted, as a control signal, to the processor 1301 for processing. The display screen 1303 is configured to provide a virtual button and/or a virtual keyboard, which is also referred to as a soft button and/or a soft keyboard. In some embodiments, there may be one display screen 1303, disposed on a front panel of the computer device 1300. In other some embodiments, there may be at least two display screens 1303, disposed on different surfaces of the computer device 1300 respectively or in a folded design. In still other embodiments, the display screen 1303 may be a flexible display screen, disposed on a curved surface or a folded surface of the computer device 1300. Even, the display screen 1303 may be further set to have a non-rectangular irregular pattern, that is, a special-shaped screen. The display screen 1303 may be made of a material such as a liquid crystal display (LCD) or an organic light-emitting diode (OLED).

A person skilled in the art may understand that the structure shown in FIG. 24 does not constitute any limitation on the computer device 1300, and the computer device may include more components or fewer components than those shown in the figure, or some components may be combined, or a different component deployment may be used.

This application further provides a terminal. The terminal includes a processor and a memory, the memory storing at least one computer program, the at least one computer program being loaded and executed by the processor to implement the method for displaying a virtual item provided in the foregoing method embodiments.

This application further provides a computer device, including a processor and a memory, the memory storing at least one computer program, the at least one computer program being loaded and executed by the processor to implement the method for displaying a virtual item provided in the foregoing method embodiments.

In some embodiments, the at least one computer program is loaded and executed by the processor to perform the following operations: displaying a first virtual environment picture, the first virtual environment picture displaying a second virtual item in an effective state; controlling, in response to a use instruction, a target virtual character to use an equipped first virtual item; displaying, in response to the second virtual item being located within a first influence range of the first virtual item, that the second virtual item is switched from the effective state to an ineffective state; and displaying, in response to satisfying a restoration condition, that the second virtual item is switched from the ineffective state to the effective state.

In some embodiments, the at least one computer program is loaded and executed by the processor to perform the following operations: switching, in response to the second virtual item being located within the first influence range of the first virtual item, the display of the second virtual item from a first display form to a second display form, the first display form being corresponding to the effective state, and the second display form being corresponding to the ineffective state.

In some embodiments, the at least one computer program is loaded and executed by the processor to perform the following operations: timing a first duration for which the second virtual item is in the ineffective state; and displaying, in response to the first duration reaching a first time threshold, that the second virtual item is switched from the ineffective state to the effective state.

In some embodiments, the at least one computer program is loaded and executed by the processor to perform the following operations: controlling, in response to the use instruction, the target virtual character to throw the first virtual item, and controlling the first virtual item to be thrown to a first position according to a throw trajectory.

In some embodiments, the at least one computer program is loaded and executed by the processor to perform the following operations: obtaining a second position of the second virtual item in a virtual environment; and displaying, in response to a distance from the first position to the second position being less than a first distance threshold, that the second virtual item is switched from the effective state to the ineffective state.

In some embodiments, the at least one computer program is loaded and executed by the processor to perform the following operations: timing, in response to the first virtual item reaching the first position, a second duration for the first virtual item at the first position; and displaying, in response to the second duration satisfying a second time threshold and the second virtual item being located within the first influence range of the first virtual item, that the second virtual item is switched from the effective state to the ineffective state.

In some embodiments, the second virtual item in the effective state is configured to periodically detect a target object located in a second influence range and produce an effect on the target object; and the at least one computer program is loaded and executed by the processor to perform the following operation: stopping the second virtual item from periodically detecting the target object within the second influence range in response to the second virtual item being located within the first influence range of the first virtual item.

In some embodiments, the at least one computer program is loaded and executed by the processor to perform the following operation: displaying, in response to the target object being located within a second influence range of the second virtual item, that the second virtual item produces an effect on the target object, where the effect includes at least one of an activity limitation of the target object or a reduction in a hit point value of the target object, and the activity limitation of the target object includes at least one of movement speed reduction, line-of-sight obstruction, slow activity, control manner change, item use limitation, or movement manner limitation of the target object.

In some embodiments, the second virtual item is located at a second position in the virtual environment; and the at least one computer program is loaded and executed by the processor to perform the following operations: obtaining a third position of the target object in the virtual environment; and displaying, in response to a distance from the second position to the third position being less than a second distance threshold, that the second virtual item produces the effect on the target object.

This application further provides a computer-readable storage medium, storing at least one computer program, the at least one computer program being loaded and executed by the processor to implement the method for displaying a virtual item provided in the foregoing method embodiments.

In some embodiments, the at least one computer program is loaded and executed by the processor to perform the following operations: displaying a first virtual environment picture, the first virtual environment picture displaying a second virtual item in an effective state; controlling, in response to a use instruction, a target virtual character to use an equipped first virtual item; displaying, in response to the second virtual item being located within a first influence range of the first virtual item, that the second virtual item is switched from the effective state to an ineffective state; and displaying, in response to satisfying a restoration condition, that the second virtual item is switched from the ineffective state to the effective state.

In some embodiments, the at least one computer program is loaded and executed by the processor to perform the following operations: switching, in response to the second virtual item being located within the first influence range of the first virtual item, the display of the second virtual item from a first display form to a second display form, the first display form being corresponding to the effective state, and the second display form being corresponding to the ineffective state.

In some embodiments, the at least one computer program is loaded and executed by the processor to perform the following operations: timing a first duration for which the second virtual item is in the ineffective state; and displaying, in response to the first duration reaching a first time threshold, that the second virtual item is switched from the ineffective state to the effective state.

In some embodiments, the at least one computer program is loaded and executed by the processor to perform the following operations: controlling, in response to the use instruction, the target virtual character to throw the first virtual item, and controlling the first virtual item to be thrown to a first position according to a throw trajectory.

In some embodiments, the at least one computer program is loaded and executed by the processor to perform the following operations: obtaining a second position of the second virtual item in a virtual environment; and displaying, in response to a distance from the first position to the second position being less than a first distance threshold, that the second virtual item is switched from the effective state to the ineffective state.

In some embodiments, the at least one computer program is loaded and executed by the processor to perform the following operations: timing, in response to the first virtual item reaching the first position, a second duration for the first virtual item at the first position; and displaying, in response to the second duration satisfying a second time threshold and the second virtual item being located within the first influence range of the first virtual item, that the second virtual item is switched from the effective state to the ineffective state.

In some embodiments, the second virtual item in the effective state is configured to periodically detect a target object located in a second influence range and produce an effect on the target object; and the at least one computer program is loaded and executed by the processor to perform the following operation: stopping the second virtual item from periodically detecting the target object within the second influence range in response to the second virtual item being located within the first influence range of the first virtual item.

In some embodiments, the at least one computer program is loaded and executed by the processor to perform the following operation: displaying, in response to the target object being located within a second influence range of the second virtual item, that the second virtual item produces an effect on the target object, where the effect includes at least one of an activity limitation of the target object or a reduction in a hit point value of the target object, and the activity limitation of the target object includes at least one of movement speed reduction, line-of-sight obstruction, slow activity, control manner change, item use limitation, or movement manner limitation of the target object.

In some embodiments, the second virtual item is located at a second position in the virtual environment; and the at least one computer program is loaded and executed by the processor to perform the following operations: obtaining a third position of the target object in the virtual environment; and displaying, in response to a distance from the second position to the third position being less than a second distance threshold, that the second virtual item produces the effect on the target object.

In some embodiments, a computer program or computer program product including at least one piece of program code is further provided, the computer program or computer program product, when run on a computer device, causing the computer device to perform any possible implementation in the method for displaying a virtual item provided in the foregoing embodiments. Details are not described herein.

It is to be understood that "plurality of" mentioned in the specification means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for displaying a virtual item, performed by a computer device, the method comprising:

displaying, on a display screen coupled to the computer device, a first virtual environment picture, the first virtual environment picture including a second virtual item in an effective state, and the second virtual item being a virtual mine placed by an enemy virtual character belonging to a second camp;

controlling, in response to a use instruction detected by the computer device and while the second virtual item is in the effective state, a target virtual character to use an equipped first virtual item, the target virtual character being controlled by a player and belonging to a first camp different from the second camp, and the first virtual item being configured to temporarily disable an item belonging to a virtual mine type located within a first influence range of the first virtual item;

displaying, in response to the first virtual item being deployed by the target virtual character and the second virtual item being located within the first influence range of the first virtual item used by the target virtual character, that the second virtual item is switched from the effective state to an ineffective state; and displaying, in response to satisfying a restoration condition, that the second virtual item is switched from the ineffective state to the effective state.

2. The method according to claim 1, wherein the displaying, in response to the second virtual item being located within the first influence range of the first virtual item, that the second virtual item is switched from the effective state to an ineffective state comprises:

switching, in response to the second virtual item being located within the first influence range of the first virtual item, the display of the second virtual item from a first display form to a second display form, the first display form corresponding to the effective state, and the second display form corresponding to the ineffective state.

3. The method according to claim 1, wherein the displaying, in response to satisfying a restoration condition, that the second virtual item is switched from the ineffective state to the effective state comprises:

timing, from a moment that the first virtual item is triggered, a first duration for which the second virtual item is in the ineffective state; and displaying, in response to the first duration reaching a first time threshold, that the second virtual item is switched from the ineffective state to the effective state.

4. The method according to claim 1, wherein the controlling, in response to a use instruction, a target virtual character to use an equipped first virtual item comprises:

controlling, in response to the use instruction, the target virtual character to throw the first virtual item, and controlling the first virtual item to be thrown to a first position according to a throw trajectory.

5. The method according to claim 4, wherein the displaying, in response to the second virtual item being located within the first influence range of the first virtual item, that the second virtual item is switched from the effective state to an ineffective state comprises:

obtaining a second position of the second virtual item in a virtual environment; and displaying, in response to a distance from the first position to the second position being less than a first distance threshold, that the second virtual item is switched from the effective state to the ineffective state.

6. The method according to claim 4, further comprising:

timing, in response to the first virtual item reaching the first position, a second duration for the first virtual item at the first position, wherein the displaying, in response to the second virtual item being located within the first influence range of the first virtual item, that the second virtual item is switched from the effective state to an ineffective state comprises:

displaying, in response to the second duration reaching a second time threshold and the second virtual item being located within the first influence range of the first virtual item, that the second virtual item is switched from the effective state to the ineffective state.

7. The method according to claim 1, wherein the second virtual item in the effective state is configured to periodically detect a target object located in a second influence range and produce an effect on the target object; and the method further comprises:

stopping the second virtual item from periodically detecting the target object within the second influence range in response to the second virtual item being located within the first influence range of the first virtual item.

8. The method according to claim 1, further comprising displaying, in response to the target object being located within a second influence range of the second virtual item, an effect on the target object produced according to the second virtual item, wherein the effect comprises at least one of an activity limitation of the target object or a reduction in a hit point value of the target object, and the activity limitation of the target object comprises at least one of movement speed reduction, line-of-sight obstruction, slow activity, control manner change, item use limitation, or movement manner limitation of the target object.

9. The method according to claim 8, wherein the second virtual item is located at a second position in the virtual environment; and the displaying, in response to the target object being located within a second influence range of the second virtual item, an effect on the target object comprises:

obtaining a third position of the target object in the virtual environment; and displaying, in response to a distance from the second position to the third position being less than a second distance threshold, the effect on the target object.

10. An apparatus for displaying a virtual item, comprising: a processor and a memory, the memory storing at least one computer program, the at least one computer program being loaded and executed by the processor to implement:

displaying, on a display screen coupled to the processor, a first virtual environment picture, the first virtual environment picture including a second virtual item in an effective state, and the second virtual item being a virtual mine placed by an enemy virtual character belonging to a second camp;

controlling, in response to a use instruction detected by the processor and while the second virtual item is in the effective state, a target virtual character to use an equipped first virtual item, the target virtual character being controlled by a player and belonging to a first camp different from the second camp, and the first virtual item being configured to temporarily disable an item belonging to a virtual mine type located within a first influence range of the first virtual item;

displaying, in response to the first virtual item being deployed by the target virtual character and the second virtual item being located within a first influence range of the first virtual item used by the target virtual character, that the second virtual item is switched from the effective state to an ineffective state; and displaying, in response to satisfying a restoration condition, that the second virtual item is switched from the ineffective state to the effective state.

11. The apparatus according to claim 10, wherein the displaying, in response to the second virtual item being located within the first influence range of the first virtual item, that the second virtual item is switched from the effective state to an ineffective state comprises:

switching, in response to the second virtual item being located within the first influence range of the first virtual item, the display of the second virtual item from a first display form to a second display form, the first display form corresponding to the effective state, and the second display form corresponding to the ineffective state.

12. The apparatus according to claim 10, wherein the displaying, in response to satisfying a restoration condition, that the second virtual item is switched from the ineffective state to the effective state comprises:
   timing, from a moment that the first virtual item is triggered, a first duration for which the second virtual item is in the ineffective state; and
   displaying, in response to the first duration reaching a first time threshold, that the second virtual item is switched from the ineffective state to the effective state.

13. The apparatus according to claim 10, wherein the controlling, in response to a use instruction, a target virtual character to use an equipped first virtual item comprises:
   controlling, in response to the use instruction, the target virtual character to throw the first virtual item, and controlling the first virtual item to be thrown to a first position according to a throw trajectory.

14. The apparatus according to claim 13, wherein the displaying, in response to the second virtual item being located within the first influence range of the first virtual item, that the second virtual item is switched from the effective state to an ineffective state comprises:
   obtaining a second position of the second virtual item in a virtual environment; and
   displaying, in response to a distance from the first position to the second position being less than a first distance threshold, that the second virtual item is switched from the effective state to the ineffective state.

15. The apparatus according to claim 13, wherein the processor is further configured to perform:
   timing, in response to the first virtual item reaching the first position, a second duration for the first virtual item at the first position, wherein
   the displaying, in response to the second virtual item being located within the first influence range of the first virtual item, that the second virtual item is switched from the effective state to an ineffective state comprises:
   displaying, in response to the second duration reaching a second time threshold and the second virtual item being located within the first influence range of the first virtual item, that the second virtual item is switched from the effective state to the ineffective state.

16. The apparatus according to claim 10, wherein the second virtual item in the effective state is configured to periodically detect a target object located in a second influence range and produce an effect on the target object; and
   the processor is further configured to perform:
   stopping the second virtual item from periodically detecting the target object within the second influence range in response to the second virtual item being located within the first influence range of the first virtual item.

17. A non-transitory computer-readable storage medium, storing at least one computer program, the at least one computer program being loaded and executed by a processor to implement:
   displaying, on a display screen coupled to the processor, a first virtual environment picture, the first virtual environment picture including a second virtual item in an effective state, and the second virtual item being a virtual mine placed by an enemy virtual character belonging to a second camp;
   controlling, in response to a use instruction detected by the processor and while the second virtual item is in the effective state, a target virtual character to use an equipped first virtual item, the target virtual character being controlled by a player and belonging to a first camp different from the second camp, and the first virtual item being configured to temporarily disable an item belonging to a virtual mine type located within a first influence range of the first virtual item;
   displaying, in response to the first virtual item being deployed by the target virtual character and the second virtual item being located within the first influence range of the first virtual item used by the target virtual character, that the second virtual item is switched from the effective state to an ineffective state; and
   displaying, in response to satisfying a restoration condition, that the second virtual item is switched from the ineffective state to the effective state.

18. The method according to claim 1, wherein the restoration condition includes at least one of:
   a duration the second virtual item being in the ineffective state reaching a time threshold;
   a virtual character of the second camp passing by the second virtual item; and
   a virtual character using a designated virtual item near the second virtual item.

19. The method according to claim 1, wherein:
   the second virtual item in the effective state is configured to automatically denotate in response to a detonating condition being satisfied; and
   the second virtual item does not detonate in the ineffective state.

20. The method according to claim 1, wherein the first virtual item is a virtual electromagnetic pulse equipment configured to activate and affect combat equipment within the first influence range after being thrown.

* * * * *